US012581516B2

(12) United States Patent
Ashraf et al.

(10) Patent No.: US 12,581,516 B2
(45) Date of Patent: Mar. 17, 2026

(54) RESOURCE SELECTION IN SIDE LINK (SL) COMMUNICATIONS

(71) Applicant: Telefonaktiebolaget LM Ericsson (publ), Stockholm (SE)

(72) Inventors: Shehzad Ali Ashraf, Munich (DE); Jose Angel Leon Calvo, Aachen (DE); Ricardo Blasco Serrano, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 334 days.

(21) Appl. No.: 18/271,120

(22) PCT Filed: Jan. 7, 2022

(86) PCT No.: PCT/SE2022/050005
§ 371 (c)(1),
(2) Date: Jul. 6, 2023

(87) PCT Pub. No.: WO2022/150007
PCT Pub. Date: Jul. 14, 2022

(65) Prior Publication Data
US 2024/0098764 A1     Mar. 21, 2024

Related U.S. Application Data

(60) Provisional application No. 63/135,233, filed on Jan. 8, 2021.

(51) Int. Cl.
*H04W 72/40* (2023.01)
*H04W 72/541* (2023.01)

(52) U.S. Cl.
CPC ......... *H04W 72/40* (2023.01); *H04W 72/541* (2023.01)

(58) Field of Classification Search
CPC ............... H04W 72/40; H04W 72/541; H04W 28/0284; H04W 72/20; H04W 72/25;
(Continued)

(56) References Cited

U.S. PATENT DOCUMENTS

| | | |
|---|---|---|
| 2020/0029318 A1 | 1/2020 | Guo |
| 2020/0229171 A1 | 7/2020 | Khoryaev et al. |

(Continued)

FOREIGN PATENT DOCUMENTS

| | | |
|---|---|---|
| EP | 3439416 A1 | 2/2019 |
| WO | 2018175553 A1 | 9/2018 |

(Continued)

OTHER PUBLICATIONS

WO_2020198760_A2 (Year: 2020).*
(Continued)

*Primary Examiner* — Rushil P. Sampat
(74) *Attorney, Agent, or Firm* — Withrow & Terranova, PLLC

(57) ABSTRACT

Systems and methods are disclosed for resource selection in sidelink communications. In one embodiment, a method performed by a wireless communication device (WCD) for resource selection for a sidelink transmission includes performing channel sensing of a channel to be used for sidelink transmission, determining a first set of resources that are available or not available from a perspective of the WCD based on results of performing the channel sensing, receiving one or more resource coordination messages from one or more neighboring WCDs, determining one or more second set of resources that are available or not available from perspectives of the one or more neighboring WCDs based on information included in the one or more resource coordination messages, and performing resource selection for a
(Continued)

sidelink transmission based on the first set of resources and the one or more second sets of resources.

15 Claims, 11 Drawing Sheets

(58) Field of Classification Search
CPC .......... H04W 72/569; H04W 74/0808; H04W 74/0825; H04W 76/14; H04L 1/08; H04L 1/1854
See application file for complete search history.

(56) References Cited

U.S. PATENT DOCUMENTS

| | | | |
|---|---|---|---|
| 2023/0156776 A1* | 5/2023 | Kupanna Subramani | .................... H04W 4/46 370/329 |
| 2023/0262774 A1* | 8/2023 | Wu | ................... H04W 28/0284 370/329 |
| 2023/0354400 A1* | 11/2023 | Elshafie | ................ H04W 72/20 |
| 2024/0298337 A1* | 9/2024 | Ye | ..................... H04W 28/0215 |

FOREIGN PATENT DOCUMENTS

| | | | |
|---|---|---|---|
| WO | 2020069879 | A1 | 4/2020 |
| WO | 2020198760 | A2 | 10/2020 |

OTHER PUBLICATIONS

WO_2022077332_A1 (Year: 2022).*
LG Electronics, "R1-2007412: Summary for AI 8.11.2.2 Feasibility and benefits for mode 2 enhancements," 3GPP TSG RAN WG1 #102-e, Aug. 17-28, 2020, Electronic Meeting, 33 pages.
Extended European Search Report for European Patent Application No. 22736960.0, mailed Oct. 22, 2024, 11 pages.
Author Unknown, "Technical Specification Group Radio Access Network; NR; Physical layer procedures for control (Release 16)," Technical Specification 38.213, Version 16.1.0, Mar. 2020, 3GPP Organizational Partners, 156 pages.
Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.
Author Unknown, "Technical Specification Group Radio Access Network; NR; Radio Resource Control (RRC) protocol specification (Release 16)," Technical Specification 38.331, Version 16.2.0, Sep. 2020, 3GPP Organizational Partners, 921 pages.
LG Electronics, "RP-193231: New WID on NR sidelink enhancement," 3GPP TSG RAN Meeting #86, Dec. 9-12, 2019, Sitges, Spain, 6 pages.
International Search Report and Written Opinion for International Patent Application No. PCT/SE2022/050005, mailed Mar. 24, 2022, 11 pages.

* cited by examiner

200

202

204-1

204-2

204-3

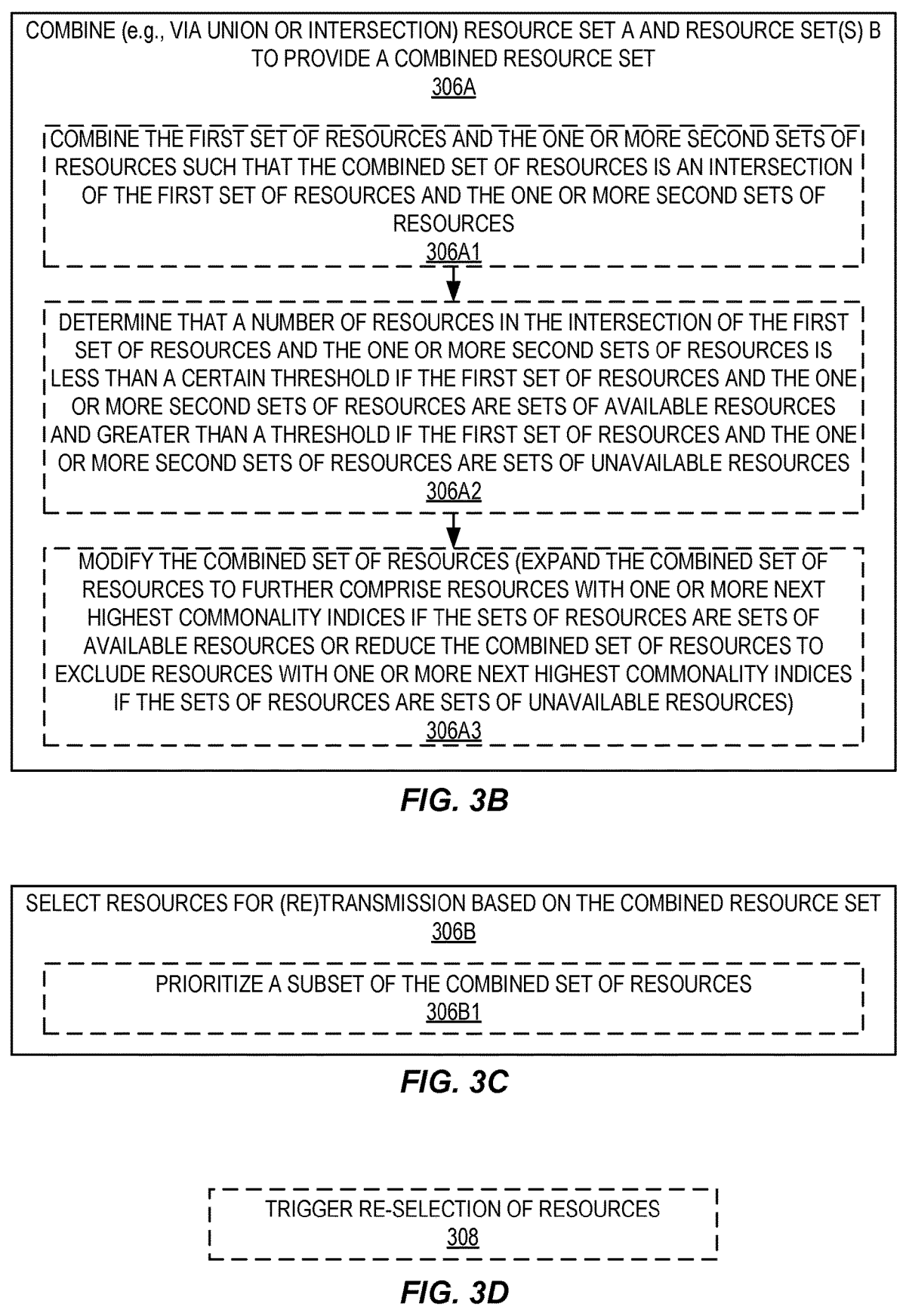

COMBINE (e.g., VIA UNION OR INTERSECTION) RESOURCE SET A AND RESOURCE SET(S) B TO PROVIDE A COMBINED RESOURCE SET
306A

COMBINE THE FIRST SET OF RESOURCES AND THE ONE OR MORE SECOND SETS OF RESOURCES SUCH THAT THE COMBINED SET OF RESOURCES IS AN INTERSECTION OF THE FIRST SET OF RESOURCES AND THE ONE OR MORE SECOND SETS OF RESOURCES
306A1

DETERMINE THAT A NUMBER OF RESOURCES IN THE INTERSECTION OF THE FIRST SET OF RESOURCES AND THE ONE OR MORE SECOND SETS OF RESOURCES IS LESS THAN A CERTAIN THRESHOLD IF THE FIRST SET OF RESOURCES AND THE ONE OR MORE SECOND SETS OF RESOURCES ARE SETS OF AVAILABLE RESOURCES AND GREATER THAN A THRESHOLD IF THE FIRST SET OF RESOURCES AND THE ONE OR MORE SECOND SETS OF RESOURCES ARE SETS OF UNAVAILABLE RESOURCES
306A2

MODIFY THE COMBINED SET OF RESOURCES (EXPAND THE COMBINED SET OF RESOURCES TO FURTHER COMPRISE RESOURCES WITH ONE OR MORE NEXT HIGHEST COMMONALITY INDICES IF THE SETS OF RESOURCES ARE SETS OF AVAILABLE RESOURCES OR REDUCE THE COMBINED SET OF RESOURCES TO EXCLUDE RESOURCES WITH ONE OR MORE NEXT HIGHEST COMMONALITY INDICES IF THE SETS OF RESOURCES ARE SETS OF UNAVAILABLE RESOURCES)
306A3

FIG. 3B

SELECT RESOURCES FOR (RE)TRANSMISSION BASED ON THE COMBINED RESOURCE SET
306B

PRIORITIZE A SUBSET OF THE COMBINED SET OF RESOURCES
306B1

FIG. 3C

TRIGGER RE-SELECTION OF RESOURCES
308

RESOURCE SELECTION IN SIDE LINK (SL) COMMUNICATIONS

RELATED APPLICATIONS

This application is a 35 U.S.C. § 371 national phase filing of International Application No. PCT/SE2022/050005, filed Jan. 7, 2022, which claims the benefit of provisional patent application Ser. No. 63/135,233, filed Jan. 8, 2021, the disclosures of which are hereby incorporated herein by reference in their entireties.

TECHNICAL FIELD

The present disclosure relates to resource selection in sidelink communications.

BACKGROUND

Third Generation Partnership Project (3GPP) specified support in Long Term Evolution (LTE) for proximity services (ProSe) in Releases 12 and 13, targeting public safety use cases (e.g., first responders) as well as a small subset of commercial use cases (e.g., discovery). The main novelty of ProSe was the introduction of device-to-device (D2D) communications using the sidelink (SL) interface. During Rel-14 and Rel-15 in 3GPP, major changes were introduced to the LTE SL framework with the aim of supporting V2X (vehicle-to-everything or vehicle-to-anything) communications, where V2X collectively denotes communication between vehicle to any other endpoint (e.g., a vehicle, a pedestrian, etc.). The feature targeted mostly basic V2X use cases such as day-1 safety, etc.

During Rel-16, 3GPP worked on specifying the sidelink interface for Fifth Generation (5G) New Radio (NR). The NR sidelink in Rel-16 mainly targets advanced V2X services, which can be categorized into four use case groups: vehicles platooning, extended sensors, advanced driving, and remote driving. The advanced V2X services require a new sidelink in order to meet the stringent requirements in terms of latency and reliability. The NR sidelink is designed to provide higher system capacity and better coverage, and to allow for an easy extension to support the future development of further advanced V2X services and other related services.

Given the targeted V2X services by NR sidelink, it is commonly recognized that groupcast/multicast and unicast transmissions are desired, in which the intended receiver of a message consists of only a subset of the vehicles in proximity to the transmitter (groupcast) or of a single vehicle (unicast). For example, in the platooning service, there are certain messages that are only of interest to the members of the platoon, making the members of the platoon a natural groupcast. In another example, the see-through use case most likely involves only a pair of vehicles, for which unicast transmissions naturally fit. Therefore, NR sidelink not only supports broadcast as in LTE sidelink, but also groupcast and unicast transmissions. Like in LTE sidelink, the NR sidelink is designed in such a way that its operation is possible with and without network coverage and with varying degrees of interaction between the User Equipments (UEs) and the network, including support for standalone, network-less operation.

In Rel-17, 3GPP is working on multiple enhancements for the sidelink with the aim of extending the support for V2X and to cover other use cases (UCs) such as public safety (see RP-193231). Among these, improving the performance of power limited UEs (e.g., pedestrian UEs, first responder UEs, etc.) and improving the performance using resource coordination are considered critical.

Regarding resource allocation for sidelink transmissions, like in LTE sidelink, there are two resource allocation modes for NR sidelink:

Network-based resource allocation, in which the network selects the resources and other transmit parameters used by sidelink UEs. In some cases, the network may control every single transmission parameter. In other cases, the network may select the resources used for transmission but may give the transmitter the freedom to select some of the transmission parameters, possibly with some restrictions. In the context of NR SL, 3GPP refers to this resource allocation mode as Mode 1.

Autonomous resource allocation, in which the UEs autonomously select the resources and other transmit parameters. In this mode, there may be no intervention by the network (e.g., out of coverage, unlicensed carriers without a network deployment, etc.) or very minimal intervention by the network (e.g., configuration of pools of resources, etc.). In the context of NR SL, 3GPP refers to this resource allocation mode as Mode 2.

The present disclosure is mostly related with operations and methods using resource allocation Mode 2 or any other mode in which the UE(s) perform sensing and resource allocation.

In NR SL transmission mode 2, distributed resource selection is employed, i.e., there is no central node for scheduling and UEs play the same role in autonomous resource selection. Transmission Mode 2 is based on two functionalities: reservation of future resources and sensing-based resource allocation. Reservation of future resources is done so that the UE sending a message also notifies the receivers about its intention to transmit using certain time-frequency resources at a later point in time. For example, a UE transmitting at time T informs the receivers that it will transmit using the same frequency resources at time T+100 milliseconds (ms). Resource reservation allows a UE to predict the utilization of the radio resources in the future. That is, by listening to the current transmissions of another UE, it also obtains information about potential future transmissions. This information can be used by the UE to avoid collisions when selecting its own resources. Specifically, a UE predicts the future utilization of the radio resources by reading received booking messages and then schedules its current transmission to avoid using the same resources. This is known as sensing-based resource selection.

The sensing-based resource selection scheme specified in NR Rel-16 can be roughly summarized in the following steps and is defined in the specification 3GPP Technical Specification (TS) 38.214 (v16.1.0).

a) A UE senses the transmission medium during an interval [n−a, n−b], where n is a time reference, and a>b≥0 define the duration of the sensing window. The length of the sensing window is (pre-)configurable.

b) Based on the sensing results, the UE predicts the future utilization of the transmission medium at a future time interval [n+T1, n+T2], where T2>T1≥0. The interval [n+T1, n+T2] is the resource selection window.

c) The UE selects one or more time-frequency resources among the resources in the selection window [n+T1, n+T2] that are predicted/determined to be selectable (e.g., idle, usable, available, etc.).

In Table 1, an excerpt of the text of 3GPP TS 38.214 that is related to resource selection (e.g., sensing and selection windows) in NR Mode 2 is provided. More specifically, The sensing window is explicitly defined in Step 2 in Table 1.

The resource selection window corresponds to the time interval $[n+T_1, n+T_2]$, as described in Step 1 in Table 1.

TABLE 1

Rel. 16 Specification related to Resource Selection in NR mode-2

8.1.4 UE procedure for determining the subset of resources to be reported to higher
    layers in PSSCH resource selection in sidelink resource allocation mode 2
In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:
    the resource pool from which the resources are to be reported;
    L1 priority, $\text{prio}_{TX}$;
    the remaining packet delay budget;
    the number of sub-channels to be used for the PSSCH/PSCCH transmission in a slot, $L_{subCH}$;
    optionally, the resource reservation interval, $P_{rsvp\_TX}$, in units of ms.
    if the higher layer requests the UE to determine a subset of resources from which the higher layer will select resources for PSSCH/PSCCH transmission as part of re-evaluation or pre-emption procedure,
    the higher layer provides a set of resources $(r_0, r_1, r_2, \ldots)$ which may be subject to re-evaluation and a set of resources $(r_0', r_1', r_2', \ldots)$ which may be subject to pre-emption.
        it is up to UE implementation to determine the subset of resources as requested by higher layers before or after the slot $r_i'' - T_3$, where $r_i''$ is the slot with the smallest slot index among $(r_0, r_1, r_2, \ldots)$ and $(r_0', r_1', r_2', \ldots)$, and $T_3$ is equal to $T_{proc,1}^{SL}$, where $T_{proc,1}^{SL}$ is defined in slots in Table 8.1.4-2 where usz is the SCS configuration of the SL BWP.
The following higher layer parameters affect this procedure:
    t2min_SelectionWindow: internal parameter $T_{2min}$ is set to the corresponding value from higher layer parameter t2min_SelectionWindow for the given value of $\text{prio}_{TX}$.
    SL-ThresRSRP_pi_pj: this higher layer parameter provides an RSRP threshold for each combination $(p_i, p_j)$, where $p_i$ is the value of the priority field in a received SCI format 1-A and $p_j$ is the priority of the transmission of the UE selecting resources; for a given invocation of this procedure, $p_j = \text{prio}_{TX}$.
    RSforSensing selects if the UE uses the PSSCH-RSRP or PSCCH-RSRP measurement, as defined in clause 8.4.2.1.
    sl-ResourceReservePeriodList
    t0_SensingWindow: internal parameter $T_0$ is defined as the number of slots corresponding to t0_SensingWindow ms.
    sl-xPercentage: internal parameter X for a given $\text{prio}_{TX}$ is defined as sl-xPercentage($\text{prio}_{TX}$) converted from percentage to ratio
    p_preemption: internal parameter $\text{prio}_{pre}$ is set to the higher layer provided parameter p_preemption
The resource reservation interval, $P_{rsvp\_TX}$, if provided, is converted from units of ms to units of logical slots, resulting in $P'_{rsvp\_TX}$ according to clause 8.1.7.
Notation:
$(t_0^{SL}, t_1^{SL}, t_2^{SL}, \ldots)$ denotes the set of slots which can belong to a sidelink resource pool and is defined in Clause 8.
The following steps are used:
    1) A candidate single-slot resource for transmission $R_{x,y}$ is defined as a set of $L_{subCH}$ contiguous sub-channels with sub-channel x + j in slot $t_y^{SL}$ where $j = 0, \ldots, L_{subCH} - 1$. The UE shall assume that any set of $L_{subCH}$ contiguous sub-channels included in the corresponding resource pool within the time interval $[n + T_1, n + T_2]$ correspond to one candidate single-slot resource, where
        selection of $T_1$ is up to UE implementation under $0 \le T_1 \le T_{proc,1}^{SL}$ where $T_{proc,1}^{SL}$ is defined in slots in Table 8.1.4-2 where usz is the SCS configuration of the SL BWP;
        if $T_{2min}$ is shorter than the remaining packet delay budget (in slots) then $T_2$ is up to UE implementation subject to $T_{2min} \le T_2 \le$ remaining packet budget (in slots); otherwise $T_2$ is set to the remaining packet delay budget (in slots).
    The total number of candidate single-slot resources is denoted by $M_{total}$.
    2) The sensing window is defined by the range of slots $[n - T_0, n - T_{proc,0}^{SL})$ where $T_0$ is defined above and $T_{proc,0}^{SL}$ is defined in slots in Table 8.1.4-1 where $\mu_{SL}$ is the SCS configuration of the SL BWP. The UE shall monitor slots which can belong to a sidelink resource pool within the sensing window except for those in which its own transmissions occur. The UE shall perform the behaviour in the following steps based on PSCCH decoded and RSRP measured in these slots.
    3) The internal parameter $Th(p_i)$ is set to the corresponding value from higher layer parameter SL-ThresRSRP_pi_pj for $p_j$ equal to the given value of $\text{prio}_{TX}$ and each priority value $p_i$.
    4) The set $S_A$ is initialized to the set of all the candidate single-slot resources.
    5) The UE shall exclude any candidate single-slot resource $R_{x,y}$ from the set $S_A$ if it meets all the following conditions:
        the UE has not monitored slot $t_m^{SL}$ in Step 2.
        for any periodicity value allowed by the higher layer parameter sl-ResourceReservePeriodList and a hypothetical SCI format 1-A received in slot $t_m^{SL}$ with "Resource reservation period" field set to that periodicity value and indicating all subchannels of the resource pool in this slot, condition c in step 6 would be met.
    6) The UE shall exclude any candidate single-slot resource $R_{x,y}$ from the set $S_A$ if it meets all the following conditions:
        a) the UE receives an SCI format 1-A in slot $t_m^{SL}$, and "Resource reservation period" field, if present, and "Priority" field in the received SCI format 1-A indicate the values $P_{rsvp\_RX}$ and $\text{prio}_{RX}$, respectively according to Clause 16.4 in [6, TS 38.213];

TABLE 1-continued

| Rel. 16 Specification related to Resource Selection in NR mode-2 |
| --- | b) the RSRP measurement performed, according to clause 8.4.2.1 for the received SCI format 1-A, is higher than $Th(prio_{RX})$;

c) the SCI format received in slot $t_m{}^{SL}$ the same SCI format which, if and only if the "Resource reservation period" field is present in the received SCI format 1-A, is assumed to be received in slot(s) $t_{m+q \times P_{rsvp\_RX}}{}^{SL}$ determines according to clause 8.1.5 the set of resource blocks and slots which overlaps with $R_{x,y+j \times P_{rsvp\_TX}}'$ for $q = 1, 2, \ldots, Q$ and $j = 0, 1, \ldots, C_{resel} - 1$. Here, $P_{rsvp\_RX}'$ is $P_{rsvp\_RX}$ converted to unites of logical slots according to clause 8.1.7, $Q = \left\lceil \dfrac{T_{scal}}{P_{rsvp\_RX}'} \right\rceil$ if $P_{rsvp\_RX} < T_{scal}$ and $n' - m \leq P_{rsvp\_RX}'$, where $t_n{}^{SL} = n$ if slot n belongs to the set $(t_0{}^{SL}, t_1{}^{SL}, \ldots, t_{T_{max}}{}^{SL})$, otherwise slot $t_n{}^{SL}$ is the first slot after slot n belonging to the set $(t_0{}^{SL}, t_1{}^{SL}, \ldots, t_{T_{max}}{}^{SL})$; otherwise Q = 1. $T_{scal}$ is set to selection window size $T_2$ converted to units of ms.

7) If the number of candidate single-slot resources remaining in the set $S_A$ is smaller than $X \cdot M_{total}$, then $Th(p_i)$ is increased by 3 dB for each priority value $Th(p_i)$ and the procedure continues with step 4.

The UE shall report set $S_A$ to higher layers.

In regard to inter-UE coordination, in this framework, a transmitting (Tx) UE receives a resource coordination message from a receiving (Rx) UE (with or without previously sending an enquiry message) to boost/improve its own resource selection as shown in FIG. 1. Based on the resource coordination message, the Tx UE then performs resource (re-)selection. That is, considering the information that the Tx UE receives in the coordination message (which is sometimes referred to herein as "channel sensing information"), it selects the (optimum) resource(s) for its own transmission. In case the Tx UE has already selected the resource(s), it may either keep the same resource(s) as selected previously in case it is (they are) still considered suitable for transmission or selects another resource(s) in case the earlier selected resource(s) is (are) not suitable for transmission based on the received coordination message.

Moreover, the coordination message can comprise either: (a) information that indicates a set of resources that are available/unavailable from the perspective of the Rx UE (e.g., a resource map indicating suitable/unsuitable resources which is referred as Map-based coordination message or (b) a flag (e.g., one-bit signal) indicating the UE to perform a re-selection of the resources selected for transmission which is referred to as flag-based coordination message.

SUMMARY

Systems and methods are disclosed for resource selection in sidelink communications. In one embodiment, a method performed by a wireless communication device (WCD) for resource selection for a sidelink transmission comprises performing channel sensing of a channel to be used for sidelink transmission and determining a first set of resources that are available or not available from a perspective of the WCD based on results of performing the channel sensing. The method further comprises receiving one or more resource coordination messages from one or more neighboring WCDs and determining one or more second set of resources that are available or not available from perspectives of the one or more neighboring WCDs based on information comprised in the one or more resource coordination messages. The method further comprises performing resource selection for a sidelink transmission based on the first set of resources and the one or more second sets of resources, wherein performing the resource selection comprises selecting (306B) one or more resources for the sidelink transmission based on a combined set of resources that are available or not available, the combined set of resources being a combination of the first set of resources and the one or more second sets of resources. In this manner, the likelihood of a collision-free resource selection by the WCD is increased.

In one embodiment, the combined set of resources is an intersection of the first set of resources and the one or more second sets of resources.

In one embodiment, the first set of resources and the one or more second sets of resources are sets of available resources, and performing the resource selection further comprises combining the first set of resources and the one or more second sets of resources such that the combined set of resources is an intersection of the first set of resources and the one or more second sets of resources, determining that a number of resources in the intersection of the first set of resources and the one or more second sets of resources is less than a certain threshold, and expanding the combined set of resources to further comprise resources with one or more next highest commonality indices.

In one embodiment, the first set of resources and the one or more second sets of resources are sets of unavailable resources, and performing the resource selection further comprises combining the first set of resources and the one or more second sets of resources such that the combined set of resources is an intersection of the first set of resources and the one or more second sets of resources, determining that a number of resources in the intersection of the first set of resources and the one or more second sets of resources is greater than a threshold, and modifying the combined set of resources to remove, as unavailable, resources with one or more next highest commonality indices.

In one embodiment, the one or more neighboring WCDs from which the one or more resource messages are received are N neighboring WCDs from which N resource messages are received, where N is an integer that is greater than or equal to 1, resources with a highest commonality index N+1 are resources in the first set of resources and all of the N second sets of resources, which is the intersection of the first set of resources and the N second sets of resources, and the resources with the one or more next highest commonality indices comprise resources with a next highest commonality index N, where resources with the next highest commonality index N are resources comprised in the first set of resources and N−1 of the N second sets of resources. In one embodiment, N=1.

In one embodiment, the combined set of resources is an intersection of the first set of resources and the one or more second sets of resources only if a total number of resources in the intersection is greater than a certain threshold if the first set of resources and the one or more second sets of resources are sets of available resources and less than a certain threshold if the first set of resources and the one or more second sets of resources are sets of unavailable resources. In one embodiment, the certain threshold is based on a priority used by the WCD to obtain the first set of resources. In another embodiment, the certain threshold is based on a priority used by one of the one or more neighboring WCDs to obtain the respective second set of resources that are available or not available from the perspective of that neighboring WCD. In one embodiment, the priority is comprised in the resource coordination message received from that neighboring WCD. In another embodiment, the certain threshold is based on a received signal power used by the WCD to obtain the first set of resources. In another embodiment, the certain threshold is based on a received signal power used by one of the one or more neighboring WCDs to obtain the respective second set of resources that are available or not available from the perspective of that neighboring WCD. In one embodiment, the received signal power is comprised in the resource coordination message received from that neighboring WCD.

In one embodiment, the combined set of resources is a union of the first set of resources and the one or more second sets of resources.

In one embodiment, performing the resource selection further comprises combining the first set of resources and the one or more second sets of resources such that the combined set of resources is a union of the first set of resources and the one or more second sets of resources only if a total number of resources in the intersection of the first set of resources and the one or more second sets of resources is less than a certain threshold if the first set of resources and the one or more second sets of resources are sets of available resources and greater than a certain threshold if the first set of resources and the one or more second sets of resources are sets of unavailable resources.

In one embodiment, performing the resource selection further comprises combining the first set of resources and the one or more second sets of resources such that the combined set of resources is an intersection of the first set of resources and the one or more second sets of resources only if a total number of resources in the intersection is greater than a certain threshold if the first set of resources and the one or more second sets of resources are sets of available resources and less than a certain threshold if the first set of resources and the one or more second sets of resources are sets of unavailable resources, and combining the first set of resources and the one or more second sets of resources such that the combined set of resources is a union of the first set of resources and the one or more second sets of resources only if the total number of resources in the intersection is less than the certain threshold if the first set of resources and the one or more second sets of resources are sets of available resources and greater than a certain threshold if the first set of resources and the one or more second sets of resources are sets of unavailable resources.

In one embodiment, the certain threshold is based on a priority used by the WCD to obtain the first set of resources, the certain threshold is based on a priority used by one of the one or more neighboring WCDs to obtain the respective second set of resources that are available or not available from the perspective of that neighboring WCD, the certain threshold is based on a received signal power used by the WCD to obtain the first set of resources, or the certain threshold is based on a received signal power used by one of the one or more neighboring WCDs to obtain the respective second set of resources that are available or not available from the perspective of that neighboring WCD.

In one embodiment, selecting the one or more resources for the sidelink transmission based on the combined set of resources comprises prioritizing a subset of the combined set of resources.

In one embodiment, performing resource selection for the sidelink transmission based on the first set of resources and the one or more second sets of resources further comprises performing resource selection for the sidelink transmission based on the first set of resources and the one or more second sets of resources and one or more rules of prioritization. In one embodiment, the first set of resources is a first set of available resources, the one or more second sets of resources are one or more second sets of available resources, and the one or more rules for prioritization comprises a rule that resources in an intersection of the first set of available resources and the one or more second sets of available resources are prioritized for selection. In another embodiment, the first set of resources is a first set of available resources, the one or more second sets of resources are one or more second sets of available resources, and the one or more rules for prioritization comprises at least two of the following rules: a rule that resources in an intersection of the first set of available resources and the one or more second sets of available resources are assigned a first priority, a rule that resources that are only in the first set of available resources are assigned a second priority, and a rule that resources that are only in any of the one or more second sets of available resources are assigned a third priority. In one embodiment, the first priority is greater than the second priority which is greater than the third priority. In one embodiment, the one or more rules for prioritization further comprise a rule that resources having the same priority are selected based on SL-RSRP. In one embodiment, the one or more rules for prioritization comprise a rule that the second set of resources of a neighboring WCD that sent the respective resource coordination message in response to an enquiry from the WCD is prioritized over the second set of resources of a neighboring WCD that sent the respective resource coordination message without first receiving an enquiry.

In one embodiment, the method further comprises triggering re-selection of resources for sidelink transmission upon determining that a number of resources in the combined set of resources is less than a threshold if the first set of resources and the one or more second sets of resources are sets of available resources and greater than a threshold if the first set of resources and the one or more second sets of resources are sets of unavailable resources.

In one embodiment, the first set of resources, the one or more second sets of resources, and the combined set of resources are sets of available resources and the method further comprises triggering re-selection of resources for sidelink transmission upon determining that a previously selected resource is not one of the resources in the combined set of resources.

In one embodiment, the first set of resources, the one or more second sets of resources, and the combined set of resources are sets of unavailable resources and the method further comprises triggering re-selection of resources for sidelink transmission upon determining that a previously selected resource is one of the resources in the combined set of resources.

In one embodiment, the method further comprises determining whether to take the one or more resource coordination messages into consideration for performing resource selection. In one embodiment, determining whether to take the one or more resource coordination messages into consideration for performing resource selection comprises considering only a number, N, of most recent resource coordination messages for performing resource selection. In one embodiment, N is a configured or pre-configured parameter.

In one embodiment, determining whether to take the one or more resource coordination messages into consideration for performing resource selection comprises determining whether to take at least one of the one or more resource coordination messages into consideration for performing resource selection based on whether the at least one of the one or more resource coordination messages was received within a predefined or (pre-)configured threshold amount of time after sending a respective enquiry message. In one embodiment, the threshold amount of time is based on a Quality of Service (QoS) requirement for the sidelink transmission and/or mobility scenario.

In one embodiment, determining whether to take the one or more resource coordination messages into consideration for performing resource selection comprises determining whether to take at least one of the one or more resource coordination messages into consideration for performing resource selection based on whether a certain time relationship is satisfied.

Corresponding embodiments of a WCD are also disclosed. In one embodiment, a WCD for resource selection for a sidelink transmission is adapted to perform channel sensing of a channel to be used for sidelink transmission, determine a first set of resources that are available or not available from a perspective of the WCD based on results of performing the channel sensing, receive one or more resource coordination messages from one or more neighboring WCDs, determine one or more second set of resources that are available or not available from perspectives of the one or more neighboring WCDs based on information comprised in the one or more resource coordination messages, and perform resource selection for a sidelink transmission based on the first set of resources and the one or more second sets of resources. In order to perform the resource selection, the WCD is further adapted to select one or more resources for the sidelink transmission based on a combined set of resources that are available or not available, the combined set of resources being a combination of the first set of resources and the one or more second sets of resources.

In one embodiment, a WCD for resource selection for a sidelink transmission comprises one or more transmitters, one or more receivers, and processing circuitry associated with the one or more transmitters and the one or more receivers. The processing circuitry is configured to cause the WCD to perform channel sensing of a channel to be used for sidelink transmission, determine a first set of resources that are available or not available from a perspective of the WCD based on results of performing the channel sensing, receive one or more resource coordination messages from one or more neighboring WCDs, determine one or more second set of resources that are available or not available from perspectives of the one or more neighboring WCDs based on information comprised in the one or more resource coordination messages, and perform resource selection for a sidelink transmission based on the first set of resources and the one or more second sets of resources. In order to perform the resource selection, the processing circuitry is further configured to cause the WCD to select one or more resources for the sidelink transmission based on a combined set of resources that are available or not available, the combined set of resources being a combination of the first set of resources and the one or more second sets of resources.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 3B and 3C illustrate further details of example embodiments of certain steps of the flow chart of FIG. 3A;

FIG. 3D illustrates an optional additional step for the flow chart of FIG. 3A;

DETAILED DESCRIPTION

Figure 1:
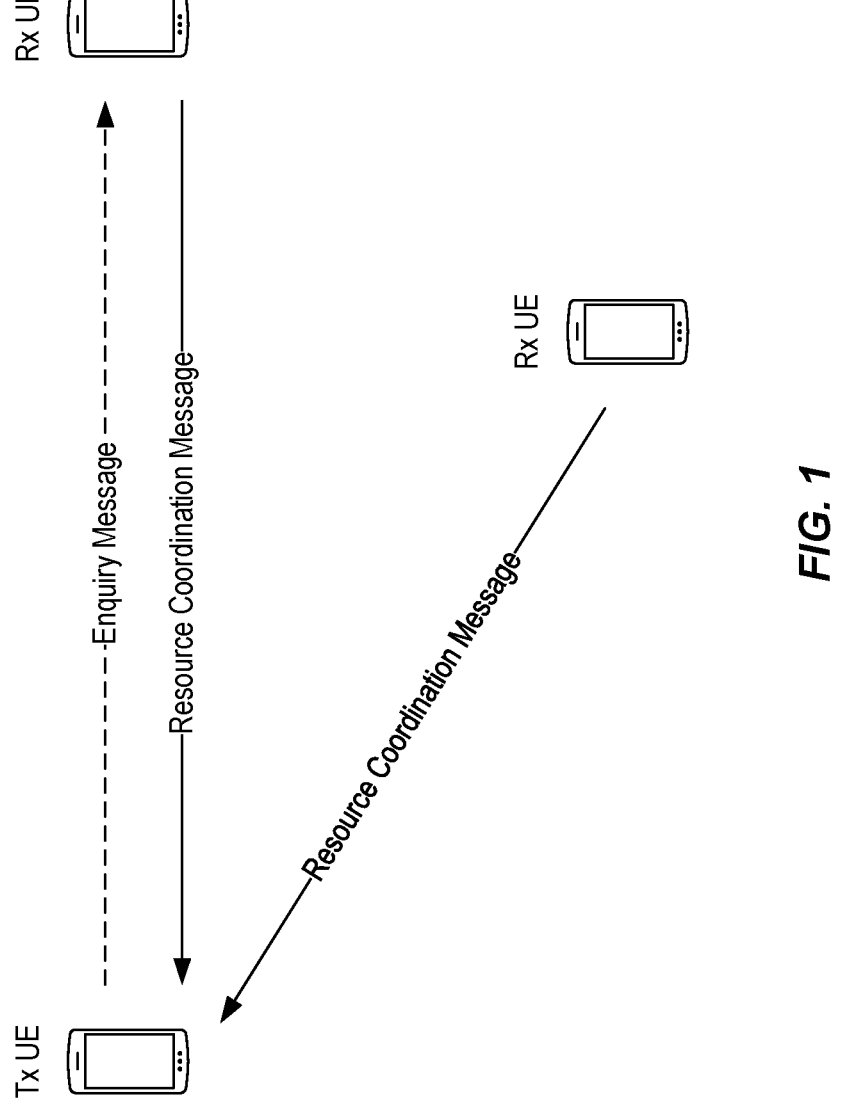
FIG. 1 illustrates inter-User Equipment (UE) coordination for resource (re-) selection.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Available Resource: In this disclosure, a resource is available from the perspective of a wireless communication device if the wireless communication device has not determined that the resource will likely be occupied by another wireless communication device or if the wireless communication device has determined that the resource may likely be occupied by another wireless communication device but the wireless communication device expects that the level of interference is low (e.g., if an associated signal power or signal strength is lower than a threshold). Similarly, a resource is unavailable from the perspective of a wireless communication device if the wireless communication device has determined that the resource will likely be occupied by another wireless communication device or if the wireless communication device has determined that the resource may likely be occupied by another wireless communication device and the wireless communication device expects that the level of interference is high (e.g., if an associated signal power or signal strength is higher than a threshold).

A wireless communication device may determine that a resource is available or unavailable by means of sensing (e.g., decoding control signaling carrying resource reservations transmitted by other wireless communication devices, performing signal power or signal strength measurements, etc.), by using information received from other wireless communication devices (e.g., inter-device coordination messages, etc.) or other nodes (e.g., a gNB). In some cases, a wireless communication device may determine that a resource is unavailable if it cannot establish that the resource is available (e.g., because the resource does not fulfill the availability criteria or because the wireless communication device cannot perform the test on the resource due to lack of information, etc.). For example, the procedure in Table 1 above builds a set (reported to higher layers) of available resources from the perspective of a UE by excluding unavailable resources (e.g., in Step 6).

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). As described above, 3GPP Rel. 17 UEs will be able to perform inter-UE coordination by exchanging resource coordination messages among each other. Such resource coordination messages will allow the transmitting (Tx) UE (i.e., Tx UE in FIG. 1) to have more accurate information about the channel and the resource pool complementing its own sensing information.

Currently, in 3GPP Rel. 17, the Tx UE behavior on the reception of the resource coordination message is not defined. In other words, it is not clear how/whether the Tx UE will consider the sensing information it receives from the neighboring UEs via the resource coordination message.

If such behavior is unspecified in Rel. 17, the mechanism of resource coordination will result in high overhead and congestion in the network without any (or minor) potential gains.

Certain aspects of the present disclosure and their embodiments may provide solutions to the aforementioned or other challenges. Systems and methods are described herein that provide well-defined behavior of a Tx UE on the reception of a resource coordination message(s). Embodiments are disclosed herein in which it is defined whether the Tx UE considers the sensing information received from the neighboring UE(s) in a resource coordination message(s) in its own resource selection procedure. Embodiments are also disclosed here that relate to how resource selection is performed if the sensing information received from the neighboring UE(s) is considered by the Tx UE for its own resource selection, e.g., rules are described to perform resource selection based on Tx UE's own sensing information and the sensing information received via the resource coordination message.

Embodiments of a method performed by a wireless communication device (WCD) for resource selection for a sidelink transmission are disclosed. In one embodiment, the method performed by a WCD for resource selection for a sidelink transmission comprises performing channel sensing of a channel to be used for sidelink transmission, determining a first set of resources that are available or not available from a perspective of the WCD based on results of performing the channel sensing, receiving one or more resource coordination messages from one or more neighboring WCDs, determining one or more second sets of resources that are available or not available from perspectives of the one or more neighboring WCDs based on information comprised in the one or more resource coordination messages, and performing resource selection for a sidelink transmission based on the first set of resources and the one or more second sets of resources. In this manner, the likelihood of a collision-free resource selection by the WCD is provided. Also, channel access latency is improved by increasing the likelihood of finding available resources.

In one embodiment, performing the resource selection comprises combining the first set of resources and the one or more second sets of resources to provide a combined set of resources and selecting one or more resources for the sidelink transmission from the combined set of resources that are available or not available.

In one embodiment, combining the first set of resources and the one or more second sets of resources comprises combining the first set of resources and the one or more second sets of resources such that the combined set of resources is a union of the first set of resources and the one or more second sets of resources. In another embodiment, combining the first set of resources and the one or more second sets of resources comprises combining the first set of resources and the one or more second sets of resources such that the combined set of resources is an intersection of the first set of resources and the one or more second sets of resources.

In another embodiment, combining the first set of resources and the one or more second sets of resources comprises combining the first set of resources and the one or more second sets of resources such that the combined set of resources is an intersection of the first set of resources and the one or more second sets of resources if and only if a total number of resources in the intersection is greater than a certain threshold in the case of available resources or less than a certain threshold in the case of unavailable resources.

In another embodiment, combining the first set of resources and the one or more second sets of resources comprises combining the first set of resources and the one or more second sets of resources such that the combined set of resources is a union of the first set of resources and the one or more second sets of resources if and only if a total number of resources in an intersection of the first set of resources and the one or more second sets of resources is less than a certain threshold in the case of available resources or greater than a certain threshold in the case of unavailable resources.

In another embodiment, combining the first set of resources and the one or more second sets of resources comprises combining the first set of resources and the one or more second sets of resources such that the combined set of resources is an intersection of the first set of resources and the one or more second sets of resources if and only if a total number of resources in the intersection is greater than a certain threshold in the case of available resources or less than a certain threshold in the case of unavailable resources, and combining the first set of resources and the one or more second sets of resources such that the combined set of resources is a union of the first set of resources and the one or more second sets of resources if and only if the total number of resources in the intersection is less than the certain threshold in the case of available resources or greater than a certain threshold in the case of unavailable resources.

In one embodiment, the certain threshold is based on a priority used by the WCD to obtain the first set of available resources. In another embodiment, the certain threshold is based on a priority used by one of the one or more neighboring WCDs to obtain the respective second set of resources that are available or not available from the perspective of that neighboring WCD. In one embodiment, the priority is comprised in the resource coordination message received from that neighboring WCD. In another embodiment, the certain threshold is based on received signal power (e.g., RSRP) or received signal strength (e.g., RSSI) used by the WCD to obtain the first set of resources. In another embodiment, the certain threshold is based on received signal power used by one of the one or more neighboring WCDs to obtain the respective second set of resources that are available or not available from the perspective of that neighboring WCD. In one embodiment, the received signal power is comprised in the resource coordination message received from that neighboring WCD.

In one embodiment, the method further comprises triggering re-selection of resources for sidelink transmission upon determining that a number of resources in the combined set of resources is less than a threshold in the case of available resources or greater than a certain threshold in the case of unavailable resources. In another embodiment, the method further comprises triggering re-selection of resources for sidelink transmission upon determining that a previously selected resource is not one of the resources in the combined set of resources in the case of available resources or is one of the resources in the combined set of resources in the case of unavailable resources.

In one embodiment, combining the first set of resources and the one or more second sets of resources comprises combining the first set of resources and the one or more second sets of resources such that the combined set of resources is an intersection of the first set of resources and the one or more second sets of resources, determining that a number of resources in the intersection of the first set of resources and the one or more second sets of resources is less than a certain threshold in the case of available resources or less than a certain threshold in the case of unavailable resources, and expanding the combined set of resources to further comprise resources with one or more next highest commonality indices.

In one embodiment, selecting the one or more resources for the sidelink transmission from the combined set of resources comprises prioritizing a subset of the combined set of resources.

In one embodiment, performing resource selection for the sidelink transmission based on the first set of resources and the one or more second sets of resources comprises performing resource selection for the sidelink transmission based on the first set of resources and the one or more second sets of resources and one or more rules of prioritization. In one embodiment, the first set of resources is a first set of available resources, the one or more second sets of resources are one or more second sets of available resources, and the one or more rules for prioritization comprises a rule that resources in an intersection of the first set of available resources and the one or more second sets of available resources are prioritized for selection. In another embodiment, the first set of resources is a first set of unavailable resources, the one or more second sets of resources are one or more second sets of unavailable resources, and the one or more rules for prioritization comprises a rule that resources that are not in an intersection of the first set of unavailable resources and the one or more second sets of unavailable resources are prioritized for selection.

In one embodiment, the first set of resources is a first set of available resources, the one or more second sets of resources are one or more second sets of available resources, and the one or more rules for prioritization comprises at least two of the following rules: a rule that resources in an intersection of the first set of available resources and the one or more second sets of available resources are assigned a first priority; a rule that resources in the first set of available resources (e.g., resources that are only in the first set of available resources, i.e., that are included in the first set of resources but not any of the second sets of available resources) are assigned a second priority; and a rule that resources in any of the one or more second sets of available resources (e.g., resources that are only in one or more of the second sets of available resources but not in the first set of available resources) are assigned a third priority. In one embodiment, the first priority is greater than the second priority which is greater than the third priority. In one embodiment, at least two of the first, second, and third priorities are the same, and the one or more rules for prioritization further comprise a rule that resources having the same priority are selected based on SL-RSRP. In one embodiment, the first set of resources is a first set of unavailable resources, the one or more second sets of resources are one or more second sets of unavailable resources, and the one or more rules for prioritization comprises at least two of the following rules: a rule that resources that are not in an intersection of the first set of unavailable resources and the one or more second sets of unavailable resources are assigned a first priority; a rule that resources that are not in the first set of unavailable resources are assigned a second priority; and a rule that resources that are not in any of the one or more second sets of unavailable resources are assigned a third priority.

In one embodiment, the one or more rules for prioritization comprise a rule that the second set of resources of a neighboring WCD that sent the respective resource coordination message in response to an enquiry from the WCD is prioritized over the second set of resources of a neighboring WCD that sent the respective resource coordination message without first receiving an enquiry.

In one embodiment, the method further comprises determining whether to take the one or more resource coordination messages into consideration for performing resource selection. In one embodiment, determining whether to take the one or more resource coordination messages into consideration for performing resource selection comprises considering only a number (N) of most recent resource coordination messages for performing resource selection. In one embodiment, N is a configured or pre-configured parameter. In one embodiment, determining whether to take the one or more resource coordination messages into consideration for performing resource selection comprises determining whether to take at least one of the one or more resource coordination messages into consideration for performing resource selection based on whether the at least one of the one or more resource configuration messages was received within a predefined or (pre-)configured threshold amount of time after sending a respective enquiry message. In one embodiment, the threshold amount of time is based on a Quality of Service (QoS) requirement for the sidelink transmission and/or mobility scenario. In one embodiment, determining whether to take the one or more resource coordination messages into consideration for performing resource selection comprises determining whether to take at least one of the one or more resource coordination messages into consideration for performing resource selection based on whether a certain time relationship is satisfied.

Corresponding embodiments of a WCD are also disclosed. In one embodiment, a WCD for resource selection for a sidelink transmission is adapted to perform channel sensing of a channel to be used for sidelink transmission, determine a first set of resources that are available or not available from a perspective of the WCD based on results of performing the channel sensing, receive one or more resource coordination messages from one or more neighboring WCDs, determine one or more second set of resources that are available or not available from perspectives of the one or more neighboring WCDs based on information comprised in the one or more resource coordination messages, and perform resource selection for a sidelink transmission based on the first set of resources and the one or more second sets of resources.

In one embodiment, a WCD for resource selection for a sidelink transmission comprises one or more transmitters, one or more receivers, and processing circuitry associated with the one or more transmitters and the one or more receivers. The processing circuitry is configured to cause the WCD to perform channel sensing of a channel to be used for sidelink transmission, determine a first set of resources that are available or not available from a perspective of the WCD based on results of performing the channel sensing, receive one or more resource coordination messages from one or more neighboring WCDs, determine one or more second set of resources that are available or not available from perspectives of the one or more neighboring WCDs based on information comprised in the one or more resource coordination messages, and perform resource selection for a sidelink transmission based on the first set of resources and the one or more second sets of resources.

Certain embodiments may provide one or more of the following technical advantage(s). Embodiments of the present disclosure may provide one or more of the following advantages:

improve the likelihood of a collision-free resource selection by a UE, improve the channel access latency by improving the likelihood of finding available resources, common behavior by the Tx UEs on reception of resource coordination message exploiting the advantages of inter-UE resource coordination mechanism.

Figure 2:
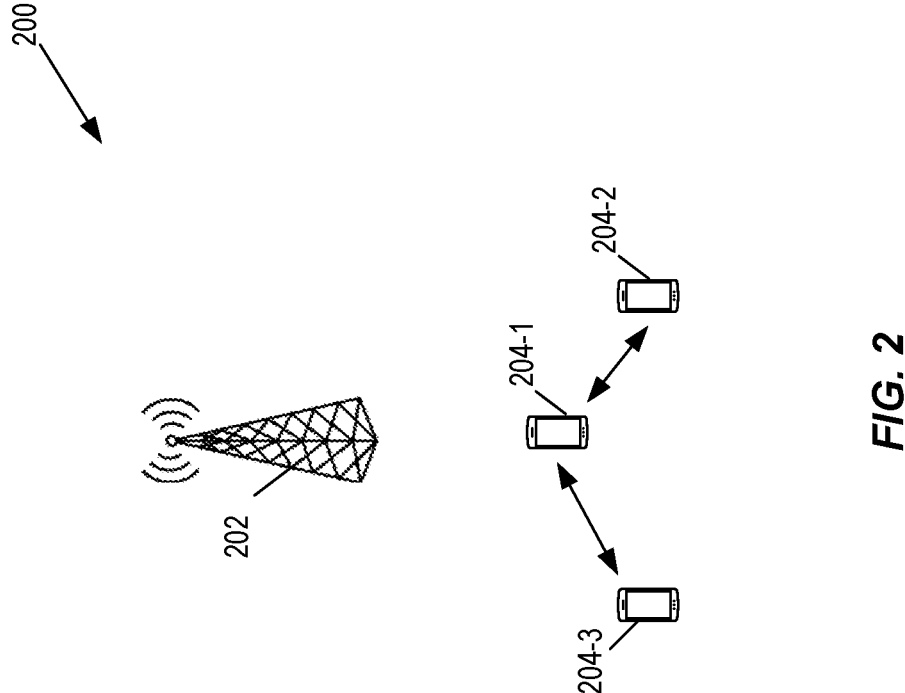
FIG. 2 illustrates one example of a cellular communications network in which embodiments of the present disclosure may be implemented.

FIG. 2 illustrates one example of a cellular communications network 200 in which embodiments of the present disclosure may be implemented. In the embodiments described herein, the cellular communications network 200 is a Radio Access Network (RAN) of a 5G system (5GS) (i.e., a Next Generation RAN (NG-RAN) or NR RAN); however, the present disclosure is not limited thereto. In this example, the cellular communications network 200 includes a network node 202 and a number of wireless communications devices (WCDs) 204. In this example, the WCDs 204 include a transmitting (Tx) WCD 204-TX and two neighboring, or receiving, WCDs 204-RX1 and 204-RX2. As discussed below in detail, the Tx WCD 204-TX performs SL resource selection considering both the channel occupancy information (aka sensing information) it gathers on its own by performing sensing and channel occupancy information that it receives from the neighboring WCD(s) 204-RX1 (and WCD 204-RX2) via a resource coordination message(s). While three WCDs 204 are illustrated in this example, there may be any number of WCDs 204. The WCD 204 are capable of sidelink communication (i.e., ProSe communication) in the embodiments described herein. In the description below, the WCDs 204 are UEs and are there sometime referred to as UEs 204.

Now, embodiments of the present disclosure are described in detail.

Systems and methods are disclosed herein for resource selection exploiting inter-UE resource coordination mechanism using (e.g., NR) sidelink (SL) communication. In some embodiments, embodiments of a method for resource selection exploiting inter-UE resource coordination mechanism using (e.g., NR) SL communication are based on an enquiry message where one of the UEs 204-TX involved in the communication requests a resource coordination message to help with its own resource selection. Based on the sensing information received via resource coordination message(s) from the neighboring UE(s) 204-RX1 (and 204-RX2), the TX UE Q104-TX performs resource selection. Even though in the present disclosure the focus is on 3GPP technology (NR SL) and terminology, most of the embodiments are, in general, applicable to any kind of direct communications between wireless communication devices involving device-to-device (D2D) communications such as LTE SL or other IEEE based technologies.

In the present disclosure, method(s) for the behavior of the Tx UE 204-TX is(are) described to perform resource selection considering both channel occupancy information (aka sensing information) that the Tx UE 204-TX gathers on its own by performing sensing and channel occupancy information that the Tx UE 204-TX receives from the neighboring UE(s) 204-RX1 (204-RX2) via a resource coordination message(s). Based on pre-defined or (pre-)configured prioritization rules, the Tx UE 204-TX prioritizes its resource selection from a certain resource subset of the set of available resources.

Figure 3A:
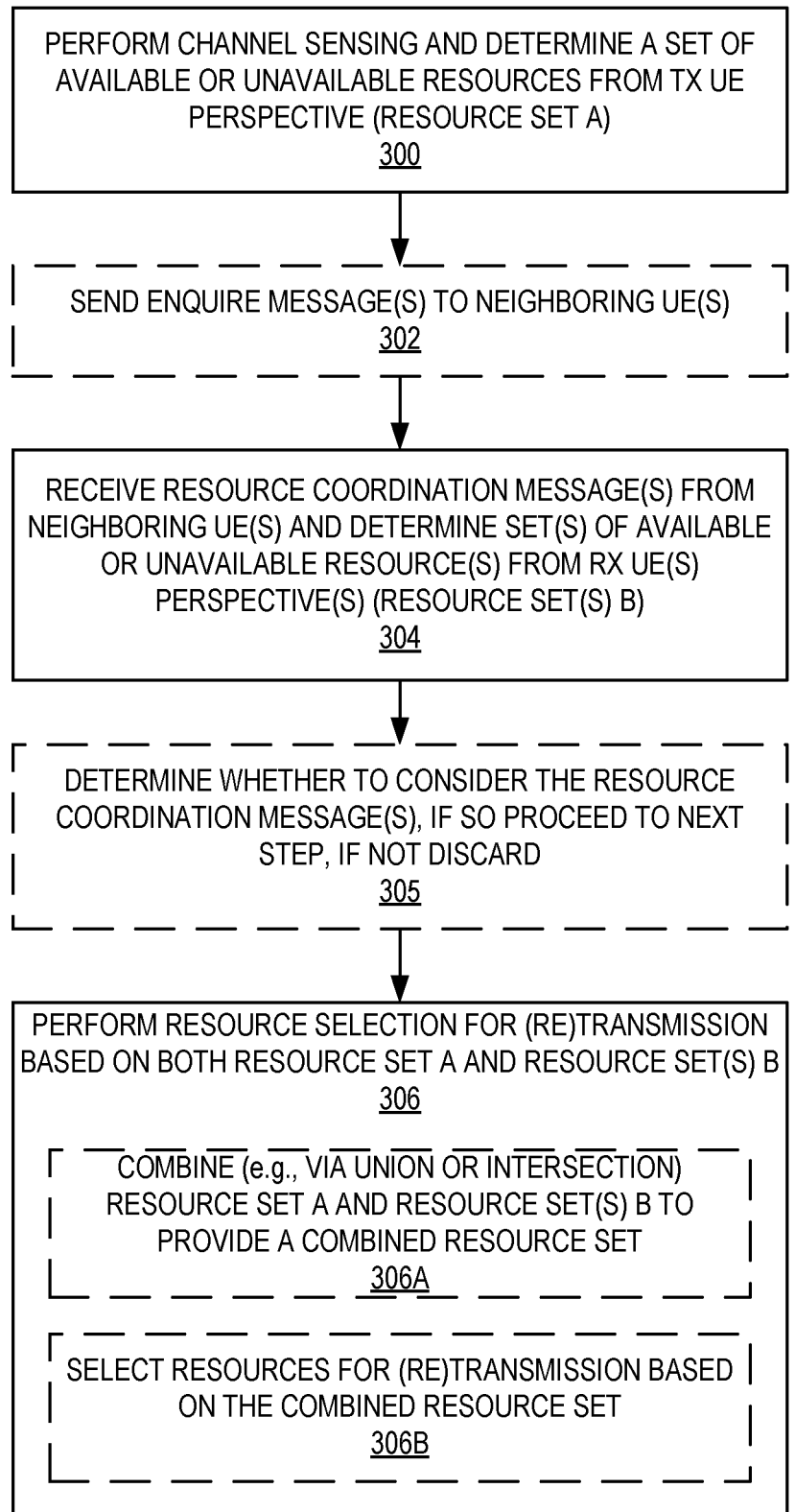
FIG. 3A is a flow chart that illustrates the operation of a transmitting (Tx) UE in accordance with embodiments of the present disclosure.

In this regard, FIG. 3 is a flow chart that illustrates the operation of the Tx UE 204-TX in accordance with embodiments of the present disclosure. Optional steps are represented by dashed boxes.

Step 300: The Tx UE 204-TX performs sensing of the channel to be used for sidelink communication and, based on results of the channel sensing, creates a set of available or unavailable resources from its own perspective. This set of resources is referred to as 'Resource Set A' hereafter.

Step 302 (Optional): The Tx UE 204-TX sends an enquiry message(s) to the neighboring UE(s) 204-RX1 (and 204-RX2) in order to ask for a resource coordination message. This step can alternatively precede Step 300.

Step 304: The Tx UE 204-TX receives resource coordination message(s) from the neighboring UE(s) 204-RX1 (and 204-RX2). Using the neighboring UE 204-RX1 as an example, the Tx UE 204-TX determines a set of available or unavailable resources from the perspective of the neighboring UE 204-RX1 based on sensing information included in the coordination message received from the neighboring UE 204-RX1. This set of resources is referred to as 'Resource Set B' hereafter. If a coordination message is received from additional neighboring UEs (e.g., neighboring UE 204-RX2), the Tx UE 204-TX determines a set of available or unavailable resources (resource set B) from the perspective of each of the additional neighboring UEs in the same manner. Thus, multiple "resource set Bs" may be determined by the Tx UE 204-Tx based on multiple received resource coordination messages.

Step 305 (Optional): The Tx UE 204-TX optionally determines whether to consider the received resource coordination message(s). If not, the resource coordination message(s) is discarded. Otherwise, the procedure proceeds to step 306. Note that the determination of step 305 may be performed prior to determining the resource set(s) B (in step 304). Also, the determination of step 305 may be performed individually for each received coordination message such that a determination is made whether to consider or discard each received coordination message individually.

Step 306: Performs resource selection for its (sidelink) (re-)transmission taking into account both the Set A and the Set B. The selection may correspond to new resources or may involve dropping an existing selection and acquiring a new one (i.e., resource reselection). In embodiment, the Tx UE 204-TX performs the resource selection by combining the resource set A and the resource set(s) B to provide a combined set of available or unavailable resources (step 306A) and selecting a resource(s) for the transmission based on the combined set of resources (step 306B). For example, if the sets of resources A and B are sets of available resources and the combined set of resources is a combined set of available resources, the Tx UE 204-TX selects the resource(s) to use for the transmission from the combined set of resources. As another example, if the sets of resources A and B are sets of unavailable resources, the Tx UE 204-TX selects the resource(s) to use for the transmission from a set of resources other than those in the combined set of resources.

In the following, embodiments related to Step 306 above are described.

According to one embodiment, the resource set A and the resource set(s) B are sets of available resources. Further, in one embodiment, while performing resource selection for a (re-)transmission in step 306, the Tx UE 204-TX prioritizes a certain subset of available resources from a combined set of available resources. The combined set of available resources is determined as a combination of its own sensing information and the sensing information received from the neighboring UE(s) via resource coordination message(s). In other words, the Tx UE 204-TX combines resource set A and resource set(s) B determined in steps 300 and 304 to provide a combined resource set (i.e., a combined set of available resources) and then prioritizes a certain subset of resources from this combined resource set.

Embodiments Related to Combination of Several Sensing Information (i.e., the Combining of Resource Set A and Resource Set(s) B)

In one embodiment, the combination of sensing information from the TX UE 204-TX and the sensing information received from the neighboring UE(s) 204-RX1 (and 204-RX2) via the resource coordination message(s) is defined as a union of both the information. In other words, the combination of resource set A determined in step 300 and the resource set(s) B determined in step 304 is the union of resource set A and resource set(s) B. As used herein, a "union" of two (or more) resource sets is a set of all resources that are in any of the two (or more) resource sets. Thus, the set of resources which is either available (or not available) from the perspective of the TX UE 204-TX or available (or not available) from the perspective of the neighboring UE(s) 204-RX1 (or 204-RX2) is considered for resource selection by the TX UE 204-TX. In another embodiment, the combination of the sensing information from the TX UE 204-TX and the sensing information received from the neighboring UE(s) 204-RX1 (and 204-RX2) via the resource coordination message(s) is defined as an intersection of both the information. In other words, the combination of resource set A determined in step 300 and the resource set(s) B determined in step 304 is the intersection of resource set A and resource set(s) B. As used herein, an "intersection" of two (or more) resource sets is a set of all resources that are in all of the two (or more) resource sets. Thus, the set of resources which is available (or not available) from both the perspective of the TX UE 204-TX and the perspective(s) of the neighboring UE(s) 204-RX1 (and 204-RX2) is considered for resource selection by the TX UE.

In one sub-embodiment, the combination of sensing information from the TX UE 204-TX and the sensing information received from the neighboring UE(s) 204-RX1 (and 204-RX2) via the resource coordination message(s) is defined as an intersection of both the information (i.e., an intersection of resource set A and resource set(s) B) if and only if the total number of resources (i.e., the total number of resources in the intersection of resource set A and resource set B) is greater than a certain threshold e.g. threshold defined by parameter X in step 7 of Table 1 above (from TS 38.214). This particular sub-embodiment may be used if the resource sets A and B are sets of available resources. However, it may also be used if the resource sets A and B are sets of unavailable resources.

In one sub-embodiment, if the total number of resources (i.e., the total number of resources in the intersection of resource set A and resource set(s) B) is smaller than a certain threshold, e.g. threshold defined by parameter X in step 7 of Table 1 above (from TS 38.214), the combination of the sensing information from the TX UE 204-TX and the sensing information received from the neighboring UE(s) 204-RX1 (and 204-RX2) via the resource coordination message(s) is defined as a union of both pieces of information (i.e., a union of resource set A and resource set(s) B). This particular sub-embodiment may be used if the resource sets A and B are sets of available resources. However, it may also be used if the resource sets A and B are sets of unavailable resources.

In one sub-embodiment, the value X used to define the minimum required number of available resources is based on the priority used by the Tx UE 204-TX to obtain its own set of available resources. Here, the priority may be the "L1 priority, $prio_{TX}$" as described above in Table 1, which is the priority level given to the packet to be transmitted by the Tx UE 204-TX performing sensing. This parameter is used to determine a power threshold, which is in turn used to decide whether a resource is available or not (i.e., if the received power on a resource carrying a reservation is above the threshold). In one embodiment, to reuse existing procedures for inter-UE coordination, some priority value (e.g., configured or pre-configured) may be used by the UE sending the inter-UE coordination message.

In one sub-embodiment, the value X used to define the minimum required number of available resources is based on the priority used by the neighboring UE(s) 204-RX1. (and/or 204-RX2), i.e., the one sending the resource coordination message, to obtain the set of available resources. In this case, the value X is signaled by the neighboring UE(s) 204-RX1 (and/or 204-RX2) as a part of the resource coordination message(s).

In one sub-embodiment, the value X used to define the minimum required number of available resources is based on the highest priority between the ones used by the neighboring UE(s) 204-RX1. (and 204-RX2), i.e., the one sending the coordination message, and the Tx UE 204-TX to obtain its own set of available resources.

In another sub-embodiment, the value X used to define the minimum required number of available resources is based on received signal power (e.g., RSRP) or received signal strength (e.g., RSSI) used by the Tx UE 204-TX to obtain the resource set A. In another embodiment, the value X used to define the minimum required number of available resources is based on received signal power used by the neighboring UE(s) 204-RX1. (and 204-RX2) to obtain the resource set(s) B. In one embodiment, the received signal power used by the neighboring UE(s) 204-RX1. (and 204-RX2) is included in the resource coordination message(s).

In one sub-embodiment, if the intersection between the own sensing set (resource set A) defined by Tx UE 204-TX and the set(s) (resource set(s) B) received from the neighboring UE(s) 204-RX1. (and 204-RX2) is below a certain threshold Y1, the Tx UE 204-TX triggers re-selection of the resources starting from Step 1 of Table 1 above (from TS 38.214). A general illustration of an optional step (step 308) for triggering re-selection in accordance with any of the embodiments/sub-embodiments described herein is illustrated in FIG. 3D.

In one sub-embodiment, the Tx UE 204-TX triggers re-selection of resources upon determining that a previously selected resource is not one of the resources in the combined set of resources (see, e.g., step 308 of FIG. 3D).

In one sub-embodiment, if the union between the own sensing set (resource set A) defined by the Tx UE 204-TX and the set(s) (resource set(s) B) received from the neighboring UE(s) 204-RX1. (and 204-RX2) is above a certain threshold Y2, e.g., the sets are completely disjoint, the Tx UE 204-TX triggers re-selection of the resources starting from Step 1 of Table 1 above (from TS 38.214) (see, e.g., step 308 of FIG. 3D). Note that the union of resource set A and resource set(s) B increases as the intersection of these resource sets decreases such that the union is at its maximum when the resource sets are disjoint.

In one sub-embodiment, more than one set of available resources are received from more than one neighboring UE (e.g., from both neighboring UEs 204-RX1 and 204-RX2).

In this case, the common set (i.e., intersection) of resources from among resource set A and resource sets B of the more than one neighboring UEs is considered if and only if the number of resources in the common set is above a (pre-) configured threshold. Otherwise, the resource set is expanded by including the resources with the next highest commonality index. In other words, as illustrated in FIG. 3B, the combining step 306A includes, in one embodiment, combining the first set of resources (resource set A) and the one or more second sets of resources (resource set(s) B)) such that the combined set of resources is an intersection of the first set of resources and the one or more second sets of resources (step 306A1), determining that a number of resources in the intersection of the first set of resources and the one or more second sets of resources is less than a certain threshold if the first set of resources and the one or more second sets of resources are sets of available resources and greater than a threshold if the first set of resources and the one or more second sets of resources are sets of unavailable resources (step 306A2), and modifying the combined set of resources (step 306A3). If the first set of resources and the one or more second sets of resources are sets of available resources, the combined set of resources is modified to further comprise resources with one or more next highest commonality indices. If the first set of resources and the one or more second sets of resources are sets of unavailable resources, the combined set of resources is modified to remove resources with one or more next highest commonality indices. As used herein, the commonality index is a representation of the number UEs, from among the set of UEs including the Tx UE 204-TX and the N neighboring UEs, for which a resource must be included the respective resource sets in order to be included in combined set of resources. So, the highest commonality index is N+1, which means that the resources in the combined set of resources are each included resource set A and all N of the resource set B's. The next highest commonality index is N, which means that the resources in the combined set of resources are each included in resource set A and N−1 of the resource set B's, and so on. For example, if the sets of resources are sets of available resources and if the TX UE 204-TX receives resource coordination messages from N neighboring UEs, then the set of resources common to both resource set A and the resource set B's of all N neighboring UEs is first considered for selection if and only if the number of resources common to resource set A and the resource set B's of all N neighboring UEs is above a (pre-)configured threshold, where this threshold could be based on, for example, priority considered as described in above sub-embodiments. Otherwise, the set of resources common to resource set A and the resource set B's of N−1 of the neighboring UEs is considered for resource selection by the TX UE 204-TX, and so on.

Embodiments Related to Prioritization of Resource(s) Selection when Selecting Resources in Step 306B

The following sub-embodiments relating to rules of prioritization are applicable where resource set A and resource set(s) B are sets of available resources. However, similar rules of prioritization may also be used when resource set A and resource set(s) B are sets of unavailable resources.

In one sub-embodiment, rules of prioritization for the selection of resources from the combined set of resources (after combination of sensing information as described above) are either pre-defined or (pre-)configured.

In one sub-embodiment, a subset of available resources to be prioritized for selection is defined as those resources in an intersection of the sets of available resources from both the TX UE 204-TX perspective and the neighboring UE(s) 204-RX1 (and 204-RX2) perspective(s) (i.e., the intersection of resource set A and resource set(s) B).

In one sub-embodiment, different level of priorities are predefined or (pre-) configured for different subsets of resources. For instance, a subset of the combined resources which is available from both the perspective of the TX UE 204-RX and the perspective(s) of the neighboring UE(s) 204-RXs (204-RX2) are prioritized (i.e., priority is defined as P1) over resources which are available from only the perspective of the TX UE 204-TX (i.e., priority is defined as P2). Furthermore, resources which are available from only the perspective of the TX UE 204-TX (i.e., priority is defined as P2) are prioritized over resources which are available from the perspective(s) of the neighboring UE(s) 204-RX1 (and 204-RX2) (i.e., priority is defined as P3). In other words, P1>P2>P3.

In a related sub-embodiment, in case two resulting subsets of resources have the same priority as defined above, e.g., P1, P2, P3, the subset obtained using a more restrictive SL-RSRP threshold (which is a function of the priority of the transmission) is selected. For instance, if a neighboring UE1 has used a SL-RSRP=1 and another neighboring UE2 has used a SL-RSRP=2, even though both are classified as P2 from the embodiment above, the resulting subset of resources obtained from the coordination message by UE1 has a higher priority. In this case, SL-RSRP threshold information is communicated by the neighboring UEs as part of the resource coordination message.

In one sub-embodiment, the priority value of the subset of resources from a UE (e.g., neighboring UE 204-RX1) which is part of an enquiry-based coordination scheme, i.e., an enquiry has been sent by the Tx UE 204-TX to that specific UE to receive a coordination message, is higher than a subset of resources indicated in the coordination message by another UE (e.g., neighboring UE 204-RX2) without a prior enquiry. Based on the procedures defined for enquiry message (e.g., if enquiry message is for one particular neighboring UE (e.g., neighboring UE 204-RX1) and resource coordination message contains the TX UE ID), the TX UE 204-TX may be able to distinguish resource coordination message received as a request in enquiry message or resource coordination message received without a prior enquiry message (e.g., periodic resource coordination messages).

In one embodiment, a pre-condition for a resource to be selected is that it is identified by the TX UE 204-TX itself during its sensing operation. Other conditions like the ones in the previous embodiments may be applied on top, but only to those resources initially identified by the TX UE 204-TX.

In one sub-embodiment, the above procedure can be extended to more than one neighboring UEs providing the sensing information via resource coordination messages. In this case, priorities of the subset of resources are determined according to their commonality index. For example, resources which are available from all UEs' perspective have the highest priority and the resources which are available from only one neighboring UE perspective have the lowest priority.

Embodiments Related to the Consideration of Resources in Step 305

In one sub-embodiment, the sensing information received via a resource coordination message in step 304 is only considered by the TX UE 204-TX for its resource selection if it is received within a certain pre-defined or (pre-)configured time threshold. For example, after request of resource coordination message (Step 302 above), if the resource coordination message is received after a pre-defined or (pre-) configured threshold, the sensing information is discarded.

In one sub-embodiment, the threshold to either consider or discard the sensing information received via the resource coordination message is pre-defined or (pre-) configured according to the QoS requirement for the associated transmission. For example, to perform resource selection of high priority traffic, stricter time budget for resource coordination message is (pre-)configured or pre-defined.

In one sub-embodiment, the threshold to either consider or discard the sensing information of the resource coordination message is pre-defined or (pre-)configured according to the mobility scenario. For example, in highspeed scenario, i.e. the TX UE 204-TX moving with high speed, stricter time budget for resource coordination message is (pre-)configured or pre-defined.

In one sub-embodiment, the threshold to either consider or discard the sensing information of resource coordination message is (pre-)configured or pre-defined according to the combination of above-mentioned criteria.

In one embodiment, the use of information received in a resource coordination message is only used if a certain time relationship is satisfied. For example:

If a resource coordination message is received at time n, it may force re-evaluation of existing selections (and eventually resource reselection) not earlier than $n+T_a$. That is, if the resource coordination message reveals a conflict for a selected resource between n and $n+T_a$, reselection may not be performed, or may be optionally performed. However, if the conflict involves a resource after $n+T_a$, reselection must be used.

If a resource coordination message is received at time n, it may be used for applications of Step 306 taking place at time $n+T_b$ or later.

Here $T_a$ and $T_b$ are time intervals to account for processing times, etc.

In one embodiment, only a number (N) of most recently received resource coordination messages are taken into consideration when performing resource selection. Here, N may be a configured or pre-configured parameter.

Figure 4:
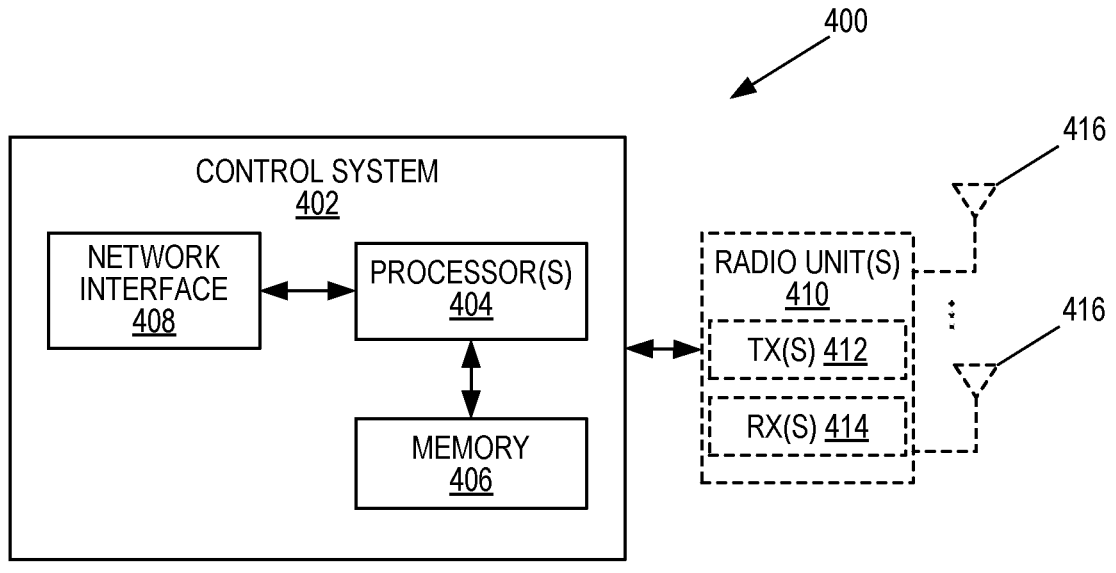
FIGS. 4, 5, and 6 are schematic block diagrams of example embodiments of a radio access node in which embodiments of the present disclosure may be implemented.

FIG. 4 is a schematic block diagram of a radio access node 400 according to some embodiments of the present disclosure. Optional features are represented by dashed boxes. The radio access node 400 may be, for example, a base station 202 or 206 or a network node that implements all or part of the functionality of the base station 202 or gNB described herein. As illustrated, the radio access node 400 includes a control system 402 that includes one or more processors 404 (e.g., Central Processing Units (CPUs), Application Specific Integrated Circuits (ASICs), Field Programmable Gate Arrays (FPGAs), and/or the like), memory 406, and a network interface 408. The one or more processors 404 are also referred to herein as processing circuitry. In addition, the radio access node 400 may include one or more radio units 410 that each includes one or more transmitters 412 and one or more receivers 414 coupled to one or more antennas 416. The radio units 410 may be referred to or be part of radio interface circuitry. In some embodiments, the radio unit(s) 410 is external to the control system 402 and connected to the control system 402 via, e.g., a wired connection (e.g., an optical cable). However, in some other embodiments, the radio unit(s) 410 and potentially the antenna(s) 416 are integrated together with the control system 402. The one or more processors 404 operate to provide one or more functions of a radio access node 400 as described herein. In some embodiments, the function(s) are implemented in software that is stored, e.g., in the memory 406 and executed by the one or more processors 404.

Figure 5:
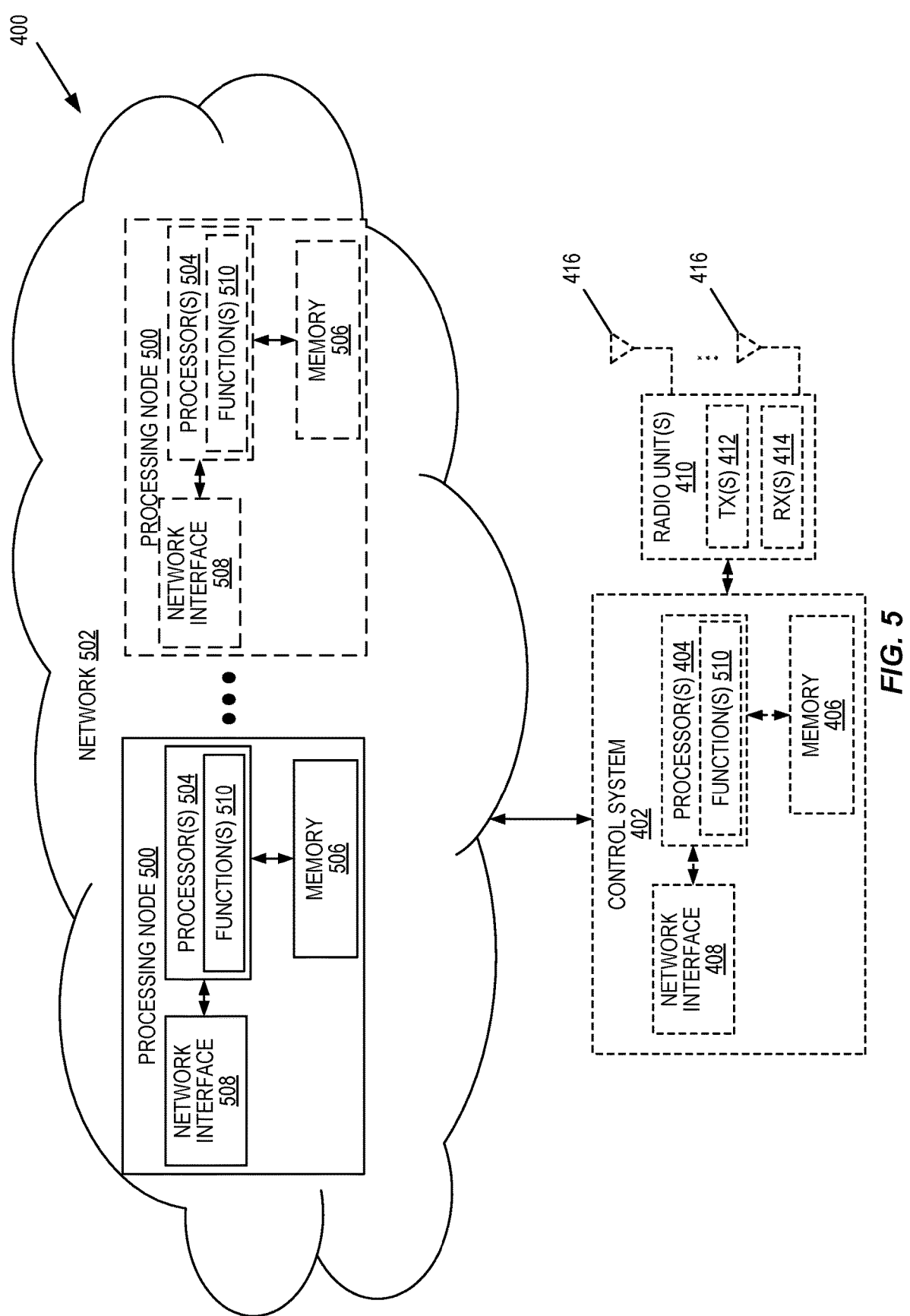

FIG. 5 is a schematic block diagram that illustrates a virtualized embodiment of the radio access node 400 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 400 in which at least a portion of the functionality of the radio access node 400 is implemented as a virtual component(s) (e.g., via a virtual machine(s) executing on a physical processing node(s) in a network(s)). As illustrated, in this example, the radio access node 400 may include the control system 402 and/or the one or more radio units 410, as described above. The control system 402 may be connected to the radio unit(s) 410 via, for example, an optical cable or the like. The radio access node 400 includes one or more processing nodes 500 coupled to or included as part of a network(s) 502. If present, the control system 402 or the radio unit(s) are connected to the processing node(s) 500 via the network 502. Each processing node 500 includes one or more processors 504 (e.g., CPUs, ASICs, FPGAs, and/or the like), memory 506, and a network interface 508.

In this example, functions 510 of the radio access node 400 described herein are implemented at the one or more processing nodes 500 or distributed across the one or more processing nodes 500 and the control system 402 and/or the radio unit(s) 410 in any desired manner. In some particular embodiments, some or all of the functions 510 of the radio access node 400 described herein are implemented as virtual components executed by one or more virtual machines implemented in a virtual environment(s) hosted by the processing node(s) 500. As will be appreciated by one of ordinary skill in the art, additional signaling or communication between the processing node(s) 500 and the control system 402 is used in order to carry out at least some of the desired functions 510. Notably, in some embodiments, the control system 402 may not be included, in which case the radio unit(s) 410 communicate directly with the processing node(s) 500 via an appropriate network interface(s).

In some embodiments, a computer program including instructions which, when executed by at least one processor, causes the at least one processor to carry out the functionality of radio access node 400 or a node (e.g., a processing node 500) implementing one or more of the functions 510 of the radio access node 400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 6:
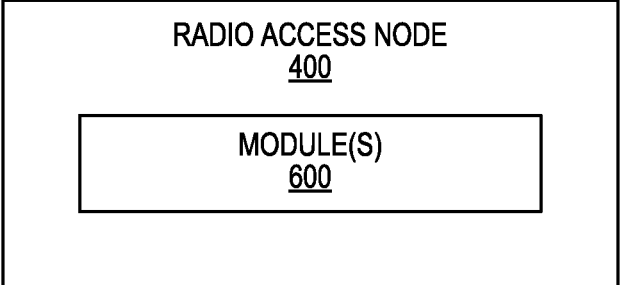

FIG. 6 is a schematic block diagram of the radio access node 400 according to some other embodiments of the present disclosure. The radio access node 400 includes one or more modules 600, each of which is implemented in software. The module(s) 600 provide the functionality of the radio access node 400 described herein. This discussion is equally applicable to the processing node 500 of FIG. 5 where the modules 600 may be implemented at one of the processing nodes 500 or distributed across multiple processing nodes 500 and/or distributed across the processing node(s) 500 and the control system 402.

Figure 7:
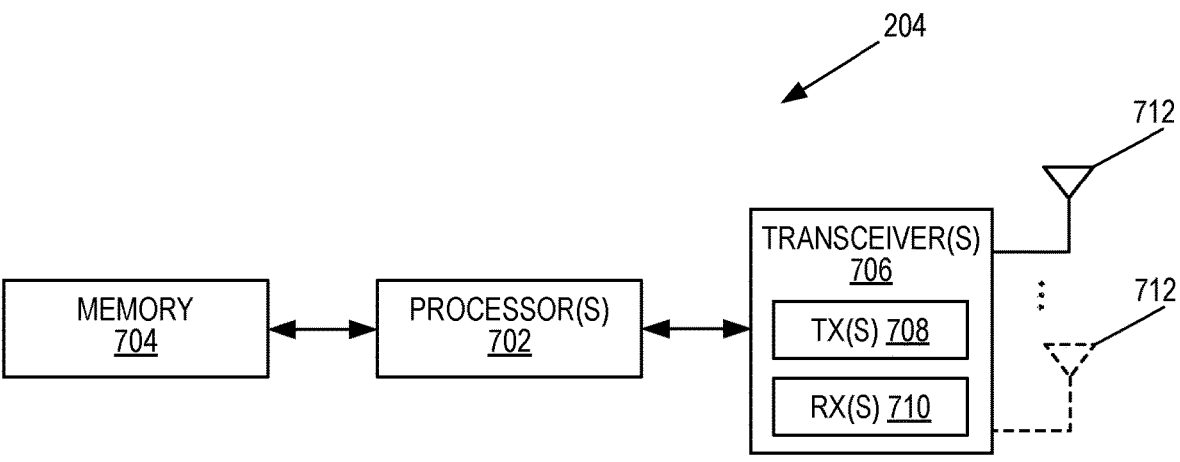
FIGS. 7 and 8 are schematic block diagrams of example embodiments of a wireless communication device or UE in which embodiments of the present disclosure may be implemented.

FIG. 7 is a schematic block diagram of a WCD 204 according to some embodiments of the present disclosure. As illustrated, the WCD 204 includes one or more processors 702 (e.g., CPUs, ASICs, FPGAs, and/or the like), memory 704, and one or more transceivers 706 each including one or more transmitters 708 and one or more receivers 710 coupled to one or more antennas 712. The transceiver(s) 706 includes radio-front end circuitry connected to the antenna(s) 712 that is configured to condition signals communicated between the antenna(s) 712 and the processor(s) 702, as will be appreciated by on of ordinary skill in the art. The processors 702 are also referred to herein as processing circuitry. The transceivers 706 are also referred to herein as radio circuitry. In some embodiments, the functionality of the WCD 204 described above may be fully or partially implemented in software that is, e.g., stored in the memory 704 and executed by the processor(s) 702. Note that the WCD 204 may include additional components not illustrated in FIG. 7 such as, e.g., one or more user interface components (e.g., an input/output interface including a display, buttons, a touch screen, a microphone, a speaker(s), and/or the like and/or any other components for allowing input of information into the WCD 204 and/or allowing output of information from the WCD 204), a power supply (e.g., a battery and associated power circuitry), etc.

In some embodiments, a computer program including instructions which, when executed by at least one processor, causes the at least one processor to carry out the functionality of the WCD 204 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
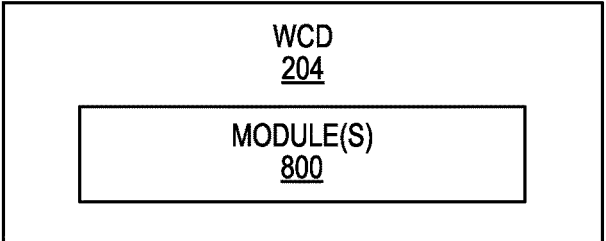

FIG. 8 is a schematic block diagram of the WCD 204 according to some other embodiments of the present disclosure. The WCD 204 includes one or more modules 800, each of which is implemented in software. The module(s) 800 provide the functionality of the WCD 204 described herein.

Figure 9:
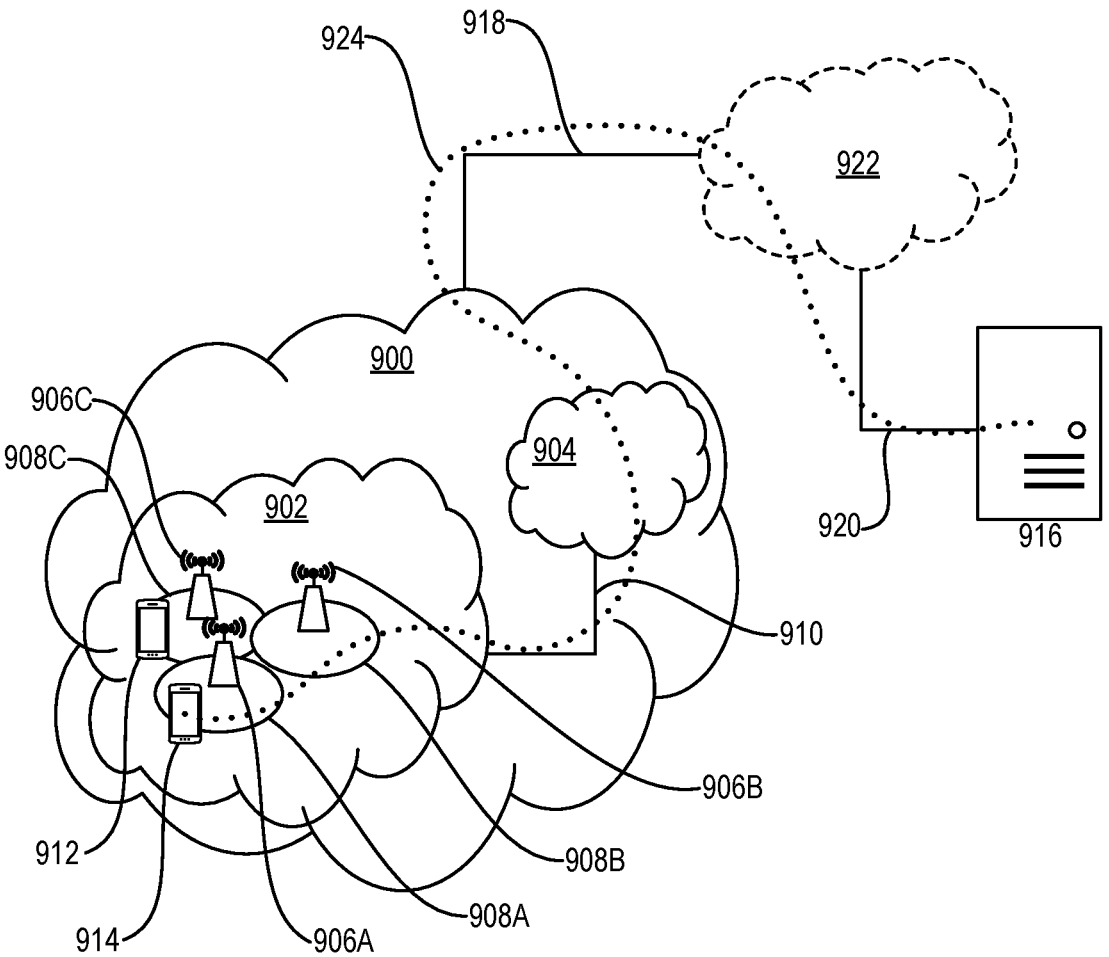
FIG. 9 illustrates an example embodiment of a communication system in which embodiments of the present disclosure may be implemented.

With reference to FIG. 9, in accordance with an embodiment, a communication system includes a telecommunication network 900, such as a 3GPP-type cellular network, which comprises an access network 902, such as a RAN, and a core network 904. The access network 902 comprises a plurality of base stations 906A, 906B, 906C, such as Node Bs, eNBs, gNBs, or other types of wireless Access Points (APs), each defining a corresponding coverage area 908A, 908B, 908C. Each base station 906A, 906B, 906C is connectable to the core network 904 over a wired or wireless connection 910. A first UE 912 located in coverage area 908C is configured to wirelessly connect to, or be paged by, the corresponding base station 906C. A second UE 914 in coverage area 908A is wirelessly connectable to the corresponding base station 906A. While a plurality of UEs 912, 914 are illustrated in this example, the disclosed embodiments are equally applicable to a situation where a sole UE is in the coverage area or where a sole UE is connecting to the corresponding base station 906.

The telecommunication network 900 is itself connected to a host computer 916, which may be embodied in the hardware and/or software of a standalone server, a cloud-implemented server, a distributed server, or as processing resources in a server farm. The host computer 916 may be under the ownership or control of a service provider, or may be operated by the service provider or on behalf of the service provider. Connections 918 and 920 between the telecommunication network 900 and the host computer 916 may extend directly from the core network 904 to the host computer 916 or may go via an optional intermediate network 922. The intermediate network 922 may be one of, or a combination of more than one of, a public, private, or hosted network; the intermediate network 922, if any, may be a backbone network or the Internet; in particular, the intermediate network 922 may comprise two or more sub-networks (not shown).

The communication system of FIG. 9 as a whole enables connectivity between the connected UEs 912, 914 and the host computer 916. The connectivity may be described as an Over-the-Top (OTT) connection 924. The host computer 916 and the connected UEs 912, 914 are configured to communicate data and/or signaling via the OTT connection 924, using the access network 902, the core network 904, any intermediate network 922, and possible further infrastructure (not shown) as intermediaries. The OTT connection 924 may be transparent in the sense that the participating communication devices through which the OTT connection 924 passes are unaware of routing of uplink and downlink communications. For example, the base station 906 may not or need not be informed about the past routing of an incoming downlink communication with data originating from the host computer 916 to be forwarded (e.g., handed over) to a connected UE 912. Similarly, the base station 906 need not be aware of the future routing of an outgoing uplink communication originating from the UE 912 towards the host computer 916.

Example implementations, in accordance with an embodiment, of the UE, base station, and host computer discussed in the preceding paragraphs will now be described with reference to FIG. 10. In a communication system 1000, a host computer 1002 comprises hardware 1004 including a communication interface 1006 configured to set up and maintain a wired or wireless connection with an interface of a different communication device of the communication system 1000. The host computer 1002 further comprises processing circuitry 1008, which may have storage and/or processing capabilities. In particular, the processing circuitry 1008 may comprise one or more programmable processors, ASICs, FPGAs, or combinations of these (not shown) adapted to execute instructions. The host computer 1002 further comprises software 1010, which is stored in or accessible by the host computer 1002 and executable by the processing circuitry 1008. The software 1010 includes a host application 1012. The host application 1012 may be operable to provide a service to a remote user, such as a UE 1014 connecting via an OTT connection 1016 terminating at the UE 1014 and the host computer 1002. In providing the service to the remote user, the host application 1012 may provide user data which is transmitted using the OTT connection 1016.

The communication system 1000 further includes a base station 1018 provided in a telecommunication system and comprising hardware 1020 enabling it to communicate with the host computer 1002 and with the UE 1014. The hardware 1020 may include a communication interface 1022 for setting up and maintaining a wired or wireless connection with an interface of a different communication device of the communication system 1000, as well as a radio interface 1024 for setting up and maintaining at least a wireless connection 1026 with the UE 1014 located in a coverage area (not shown in FIG. 10) served by the base station 1018.

The communication interface 1022 may be configured to facilitate a connection 1028 to the host computer 1002. The connection 1028 may be direct or it may pass through a core network (not shown in FIG. 10) of the telecommunication system and/or through one or more intermediate networks outside the telecommunication system. In the embodiment shown, the hardware 1020 of the base station 1018 further includes processing circuitry 1030, which may comprise one or more programmable processors, ASICs, FPGAs, or combinations of these (not shown) adapted to execute instructions. The base station 1018 further has software 1032 stored internally or accessible via an external connection.

The communication system 1000 further includes the UE 1014 already referred to. The UE's 1014 hardware 1034 may include a radio interface 1036 configured to set up and maintain a wireless connection 1026 with a base station serving a coverage area in which the UE 1014 is currently located. The hardware 1034 of the UE 1014 further includes processing circuitry 1038, which may comprise one or more programmable processors, ASICs, FPGAs, or combinations of these (not shown) adapted to execute instructions. The UE 1014 further comprises software 1040, which is stored in or accessible by the UE 1014 and executable by the processing circuitry 1038. The software 1040 includes a client application 1042. The client application 1042 may be operable to provide a service to a human or non-human user via the UE 1014, with the support of the host computer 1002. In the host computer 1002, the executing host application 1012 may communicate with the executing client application 1042 via the OTT connection 1016 terminating at the UE 1014 and the host computer 1002. In providing the service to the user, the client application 1042 may receive request data from the host application 1012 and provide user data in response to the request data. The OTT connection 1016 may transfer both the request data and the user data. The client application 1042 may interact with the user to generate the user data that it provides.

Figure 10:
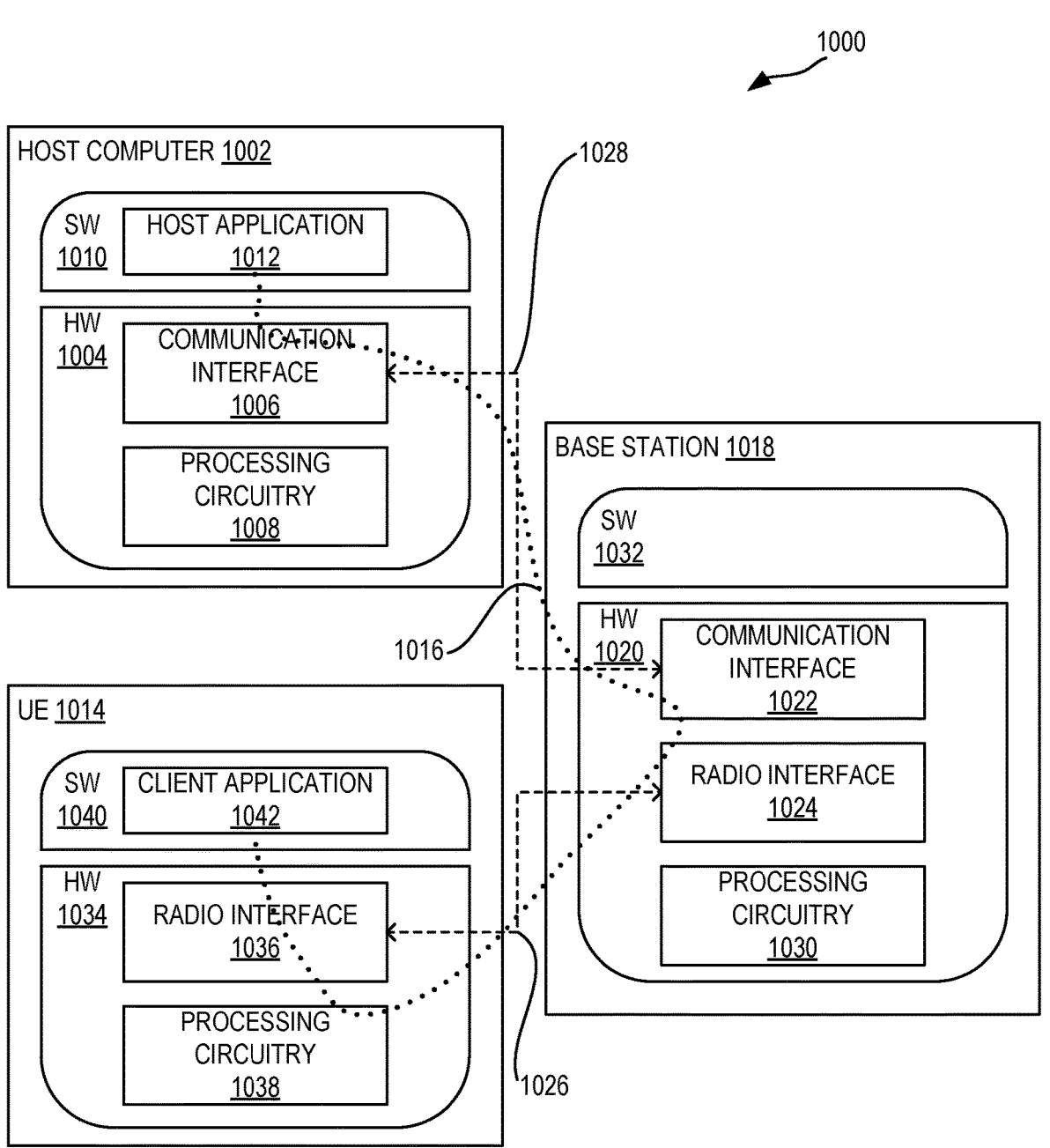
FIG. 10 illustrates example embodiments of the host computer, base station, and UE of FIG. 9.

It is noted that the host computer 1002, the base station 1018, and the UE 1014 illustrated in FIG. 10 may be similar or identical to the host computer 916, one of the base stations 906A, 906B, 906C, and one of the UEs 912, 914 of FIG. 9, respectively. This is to say, the inner workings of these entities may be as shown in FIG. 10 and independently, the surrounding network topology may be that of FIG. 9.

In FIG. 10, the OTT connection 1016 has been drawn abstractly to illustrate the communication between the host computer 1002 and the UE 1014 via the base station 1018 without explicit reference to any intermediary devices and the precise routing of messages via these devices. The network infrastructure may determine the routing, which may be configured to hide from the UE 1014 or from the service provider operating the host computer 1002, or both. While the OTT connection 1016 is active, the network infrastructure may further take decisions by which it dynamically changes the routing (e.g., on the basis of load balancing consideration or reconfiguration of the network).

The wireless connection 1026 between the UE 1014 and the base station 1018 is in accordance with the teachings of the embodiments described throughout this disclosure. One or more of the various embodiments improve the performance of OTT services provided to the UE 1014 using the OTT connection 1016, in which the wireless connection 1026 forms the last segment.

A measurement procedure may be provided for the purpose of monitoring data rate, latency, and other factors on which the one or more embodiments improve. There may further be an optional network functionality for reconfiguring the OTT connection 1016 between the host computer 1002 and the UE 1014, in response to variations in the measurement results. The measurement procedure and/or the network functionality for reconfiguring the OTT connection 1016 may be implemented in the software 1010 and the hardware 1004 of the host computer 1002 or in the software 1040 and the hardware 1034 of the UE 1014, or both. In some embodiments, sensors (not shown) may be deployed in or in association with communication devices through which the OTT connection 1016 passes; the sensors may participate in the measurement procedure by supplying values of the monitored quantities exemplified above, or supplying values of other physical quantities from which the software 1010, 1040 may compute or estimate the monitored quantities. The reconfiguring of the OTT connection 1016 may include message format, retransmission settings, preferred routing, etc.; the reconfiguring need not affect the base station 1018, and it may be unknown or imperceptible to the base station 1018. Such procedures and functionalities may be known and practiced in the art. In certain embodiments, measurements may involve proprietary UE signaling facilitating the host computer 1002's measurements of throughput, propagation times, latency, and the like. The measurements may be implemented in that the software 1010 and 1040 causes messages to be transmitted, in particular empty or 'dummy' messages, using the OTT connection 1016 while it monitors propagation times, errors, etc.

Figures 11, 12:
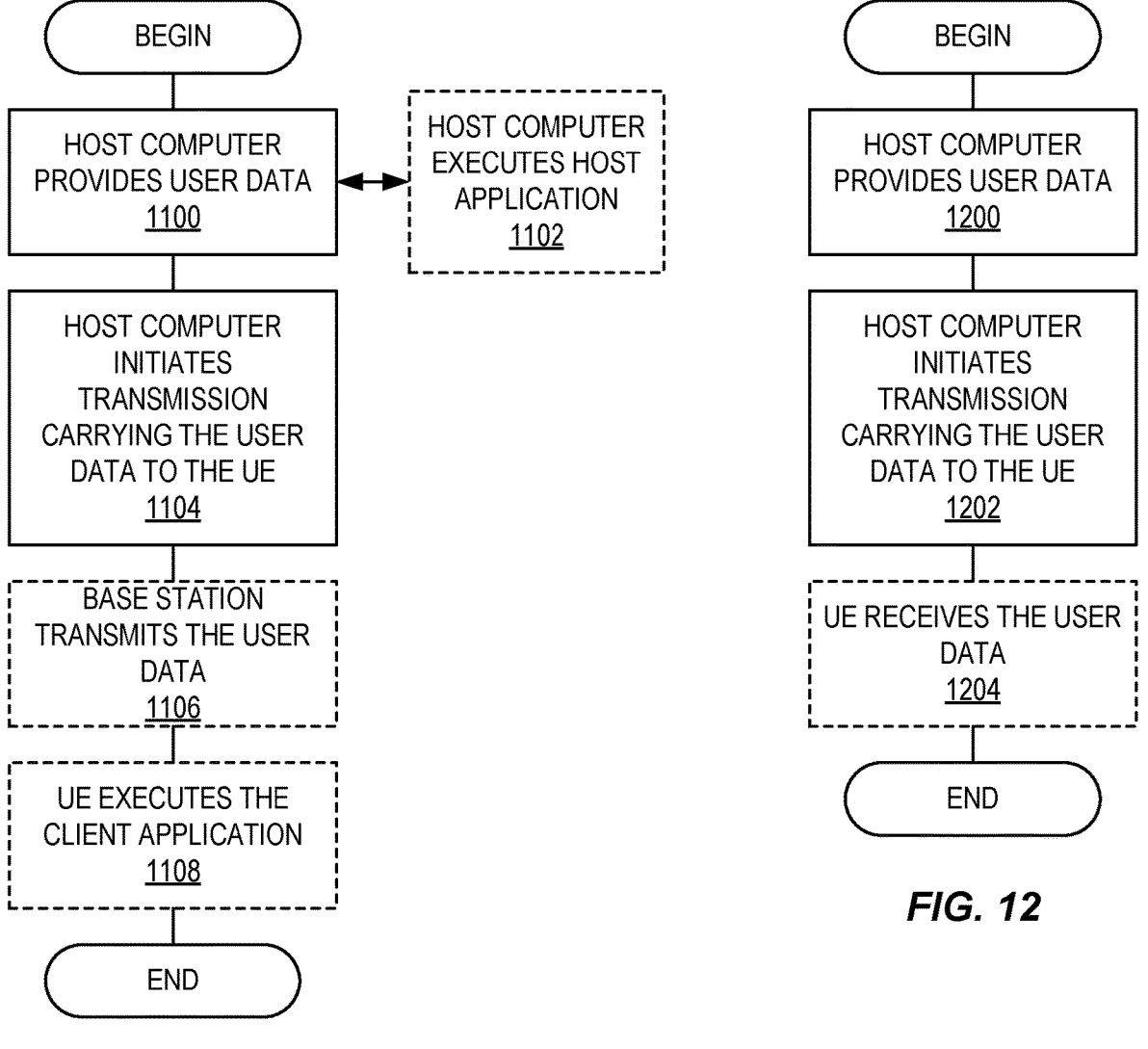
FIGS. 11, 12, 13, and 14 are flow charts that illustrate example embodiments of methods implemented in a communication system such as that of FIG. 9.

FIG. 11 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 11 will be included in this section. In step 1100, the host computer provides user data. In sub-step 1102 (which may be optional) of step 1100, the host computer provides the user data by executing a host application. In step 1104, the host computer initiates a transmission carrying the user data to the UE. In step 1106 (which may be optional), the base station transmits to the UE the user data which was carried in the transmission that the host computer initiated, in accordance with the teachings of the embodiments described throughout this disclosure. In step 1108 (which may also be optional), the UE executes a client application associated with the host application executed by the host computer.

FIG. 12 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 12 will be included in this section. In step 1200 of the method, the host computer provides user data. In an optional sub-step (not shown) the host computer provides the user data by executing a host application. In step 1202, the host computer initiates a transmission carrying the user data to the UE. The transmission may pass via the base station, in accordance with the teachings of the embodiments described throughout this disclosure. In step 1204 (which may be optional), the UE receives the user data carried in the transmission.

Figures 13, 14:
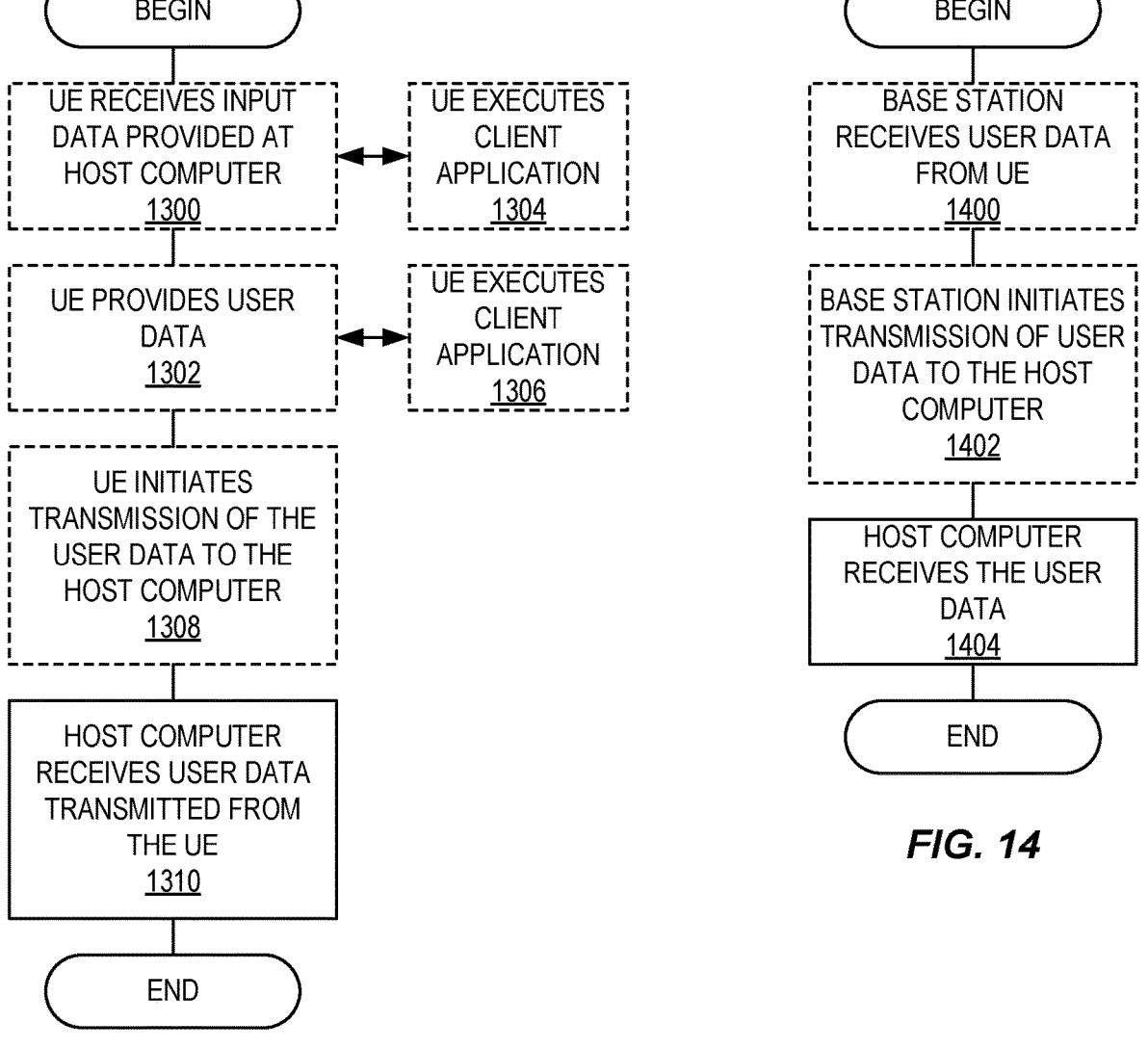

FIG. 13 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 13 will be included in this section. In step 1300 (which may be optional), the UE receives input data provided by the host computer. Additionally or alternatively, in step 1302, the UE provides user data. In sub-step 1304 (which may be optional) of step 1300, the UE provides the user data by executing a client application. In sub-step 1306 (which may be optional) of step 1302, the UE executes a client application which provides the user data in reaction to the received input data provided by the host computer. In providing the user data, the executed client application may further consider user input received from the user. Regardless of the specific manner in which the user data was provided, the UE initiates, in sub-step 1308 (which may be optional), transmission of the user data to the host computer. In step 1310 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 14 will be included in this section. In step 1400 (which may be optional), in accordance with the teachings of the embodiments described throughout this disclosure, the base station receives user data from the UE. In step 1402 (which may be optional), the base station initiates transmission of the received user data to the host computer. In step 1404 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments disclosed herein are as follows:

Embodiment 1: A method performed by a wireless communication device, WCD, (204-TX) for resource selection for a sidelink transmission, the method comprising one or more of the following:

performing (300) channel sensing of a channel to be used for sidelink transmission;

determining (300) a first set of resources that are available or not available from a perspective of the WCD (204-TX) based on results of performing (300) the channel sensing;

receiving (304) one or more resource coordination messages from one or more neighboring WCDs (204-RX1, 204-RX2);

determining (304) one or more second set of resources that are available or not available from perspectives of the one or more neighboring WCDs (204-RX1, 204-RX2) based on information comprised in the one or more resource coordination messages; and performing (306) resource selection for a sidelink transmission based on the first set of resources and the one or more second sets of resources.

Embodiment 2: The method of embodiment 1 wherein performing (306) the resource selection comprises: combining (306A) the first set of resources and the one or more second sets of resources to provide a combined set of resources that are available or not available; and selecting (306B) one or more resources for the sidelink transmission based on the combined set of resources.

Embodiment 3: The method of embodiment 2 wherein combining (306A) the first set of resources and the one or more second sets of resources comprises combining (306A) the first set of resources and the one or more second sets of resources such that the combined set of resources is a union of the first set of resources and the one or more second sets of resources.

Embodiment 4: The method of embodiment 2 wherein combining (306A) the first set of resources and the one or more second sets of resources comprises combining (306A) the first set of resources and the one or more second sets of resources such that the combined set of resources is an intersection of the first set of resources and the one or more second sets of resources.

Embodiment 5: The method of embodiment 2 wherein combining (306A) the first set of resources and the one or more second sets of resources comprises: combining (306A) the first set of resources and the one or more second sets of resources such that the combined set of resources is an intersection of the first set of resources and the one or more second sets of resources if and only if a total number of resources in the intersection is greater than a certain threshold if the first set of resources and the one or more second sets of resources are sets of available resources and less than a certain threshold if the first set of resources and the one or more second sets of resources are sets of unavailable resources.

Embodiment 6: The method of embodiment 2 wherein combining (306A) the first set of resources and the one or more second sets of resources comprises: combining (306A) the first set of resources and the one or more second sets of resources such that the combined set of resources is a union of the first set of resources and the one or more second sets of resources if and only if a total number of resources in an intersection of the first set of resources and the one or more second sets of resources is less than a certain threshold if the first set of resources and the one or more second sets of resources are sets of available resources and greater than a certain threshold if the first set of resources and the one or more second sets of resources are sets of unavailable resources.

Embodiment 7: The method of embodiment 2 wherein combining (306A) the first set of resources and the one or more second sets of resources comprises: combining (306A) the first set of resources and the one or more second sets of resources such that the combined set of resources is an intersection of the first set of resources and the one or more second sets of resources if and only if a total number of resources in the intersection is greater than a certain threshold if the first set of resources and the one or more second sets of resources are sets of available resources and less than a certain threshold if the first set of resources and the one or more second sets of resources are sets of unavailable resources; and combining (306A) the first set of resources and the one or more second sets of resources such that the combined set of resources is a union of the first set of resources and the one or more second sets of resources if and only if the total number of resources in the intersection is less than the certain threshold if the first set of resources and the one or more second sets of resources are sets of available resources and greater than a certain threshold if the first set of resources and the one or more second sets of resources are sets of unavailable resources.

Embodiment 8: The method of any of embodiments 5 to 7 wherein the certain threshold is based on a priority used by the WCD (204-TX) to obtain the first set of resources.

Embodiment 9: The method of any of embodiments 5 to 7 wherein the certain threshold is based on a priority used by one of the one or more neighboring WCDs (204-RX1, 204-RX2) to obtain the respective second set of resources that are available or not available from the perspective of that neighboring WCD.

Embodiment 10: The method of embodiment 9 wherein the priority is comprised in the resource coordination message received from that neighboring WCD.

Embodiment 11: The method of any of embodiments 5 to 7 wherein the certain threshold is based on a received signal power used by the WCD (204-TX) to obtain the first set of resources.

Embodiment 12: The method of any of embodiments 5 to 7 wherein the certain threshold is based on a received signal power used by one of the one or more neighboring WCDs (204-RX1, 204-RX2) to obtain the respective second set of resources that are available or not available from the perspective of that neighboring WCD.

Embodiment 13: The method of embodiment 12 wherein the received signal power is comprised in the resource coordination message received from that neighboring WCD.

Embodiment 14: The method of any of embodiments 2 to 13 further comprising triggering re-selection of resources for sidelink transmission upon determining that a number of resources in the combined set of resources is less than a threshold if the first set of resources and the one or more second sets of resources are sets of available resources and greater than a threshold if the first set of resources and the one or more second sets of resources are sets of unavailable resources.

Embodiment 15: The method of any of embodiments 2 to 13 wherein the first set of resources, the one or more second sets of resources, and the combined set of resources are sets of available resources and the method further comprises triggering re-selection of resources for sidelink transmission upon determining that a previously selected resource is not one of the resources in the combined set of resources.

Embodiment 16: The method of any of embodiments 2 to 13 wherein the first set of resources, the one or more second sets of resources, and the combined set of resources are sets of unavailable resources and the method further comprises triggering re-selection of resources for sidelink transmission upon determining that a previously selected resource is one of the resources in the combined set of resources.

Embodiment 17: The method of embodiment 2 wherein combining (306A) the first set of resources and the one or more second sets of resources comprises:

combining (306A) the first set of resources and the one or more second sets of resources such that the combined set of resources is an intersection of the first set of resources and the one or more second sets of resources;

determining that a number of resources in the intersection of the first set of resources and the one or more second sets of resources is less than a certain threshold if the first set of resources and the one or more second sets of resources are sets of available resources and greater than a threshold if the first set of resources and the one or more second sets of resources are sets of unavailable resources; and expanding the combined set of resources to further comprise resources with one or more next highest commonality indices.

Embodiment 18: The method of any of embodiments 2 to 17 wherein selecting (306B) the one or more resources for the sidelink transmission from the combined set of resources comprises prioritizing a subset of the combined set of resources.

Embodiment 19: The method of any of embodiments 1 to 18 wherein performing (306) resource selection for the sidelink transmission based on the first set of resources and the one or more second sets of resources comprises performing (306) resource selection for the sidelink transmission based on the first set of resources and the one or more second sets of resources and one or more rules of prioritization.

Embodiment 20: The method of embodiment 19 wherein the first set of resources is a first set of available resources, the one or more second sets of resources are one or more second sets of available resources, and the one or more rules for prioritization comprises a rule that resources in an intersection of the first set of available resources and the one or more second sets of available resources are prioritized for selection.

Embodiment 21: The method of embodiment 19 wherein the first set of resources is a first set of available resources, the one or more second sets of resources are one or more second sets of available resources, and the one or more rules for prioritization comprises at least two of the following rules:

a rule that resources in an intersection of the first set of available resources and the one or more second sets of available resources are assigned a first priority;

a rule that resources in the first set of available resources are assigned a second priority; and a rule that resources in any of the one or more second sets of available resources are assigned a third priority.

Embodiment 22: The method of embodiment 21 wherein the first priority is greater than the second priority which is greater than the third priority.

Embodiment 23: The method of embodiment 21 wherein the one or more rules for prioritization further comprise a rule that resources having the same priority are selected based on SL-RSRP.

Embodiment 24: The method of any of embodiments 19 to 23 wherein the one or more rules for prioritization comprise a rule that the second set of resources of a neighboring WCD that sent the respective resource coordination message in response to an enquiry from the WCD (204-TX) is prioritized over the second set of resources of a neighboring WCD that sent the respective resource coordination message without first receiving an enquiry.

Embodiment 25: The method of any of embodiments 1 to 24 further comprising determining (305) whether to take the one or more resource coordination messages into consideration for performing (306) resource selection.

Embodiment 26: The method of embodiment 25 wherein determining (305) whether to take the one or more resource coordination messages into consideration for performing (306) resource selection comprises considering only a number, N, of most recent resource coordination messages for performing (306) resource selection.

Embodiment 27: The method of embodiment 26 wherein N is a configured or pre-configured parameter.

Embodiment 28: The method of embodiment 25 wherein determining (305) whether to take the one or more resource coordination messages into consideration for performing (306) resource selection comprises determining (305) whether to take at least one of the one or more resource coordination messages into consideration for performing (306) resource selection based on whether the at least one of the one or more resource coordination messages was received within a predefined or (pre-) configured threshold amount of time after sending a respective enquiry message.

Embodiment 29: The method of embodiment 28 wherein the threshold amount of time is based on a Quality of Service, QoS, requirement for the sidelink transmission and/or mobility scenario.

Embodiment 30: The method of embodiment 25 wherein determining (305) whether to take the one or more resource coordination messages into consideration for performing (306) resource selection comprises determining (305) whether to take at least one of the one or more resource coordination messages into consideration for performing (306) resource selection based on whether a certain time relationship is satisfied.

Embodiment 31: A wireless communication device, WCD, (204-TX) for resource selection for a sidelink transmission, the WCD (204-TX) adapted to do one or more of the following:

perform (300) channel sensing of a channel to be used for sidelink transmission;

determine (300) a first set of resources that are available or not available from a perspective of the WCD (204-TX) based on results of performing (300) the channel sensing;

receive (304) one or more resource coordination messages from one or more neighboring WCDs (204-RX1, 204-RX2);

determine (304) one or more second set of resources that are available or not available from perspectives of the one or more neighboring WCDs (204-RX1, 204-RX2) based on information comprised in the one or more resource coordination messages; and perform (306) resource selection for a sidelink transmission based on the first set of resources and the one or more second sets of resources.

Embodiment 32: The WCD (204-TX) of embodiment 31 wherein the WCD (204-TX) is further adapted to perform the method of any of embodiments 2 to 30.

Embodiment 33: A wireless communication device, WCD, (204-TX) for resource selection for a sidelink transmission, the WCD (204-TX) comprising:

one or more transmitters (708);

one or more receivers (710); and processing circuitry (702) associated with the one or more transmitters (708) and the one or more receivers (710), the processing circuitry (702) configured to cause the WCD (204-TX) to do one or more of the following:

perform (300) channel sensing of a channel to be used for sidelink transmission;

determine (300) a first set of resources that are available or not available for sidelink transmission from a perspective of the WCD (204-TX) based on results of performing (300) the channel sensing;

receive (304) one or more resource coordination messages from one or more neighboring WCDs (204-RX1, 204-RX2);

determine (304) one or more second set of resources that are available or not available from perspectives of the one or more neighboring WCDs (204-RX1, 204-RX2) based on information comprised in the one or more resource coordination messages; and perform (306) resource selection for a sidelink transmission based on the first set of resources and the one or more second sets of resources.

Embodiment 34: The WCD (204-TX) of embodiment 33 wherein the processing circuitry (702) is further configured to cause the WCD (204-TX) to perform the method of any of embodiments 2 to 30.

Embodiment 35: A computer program comprising instructions which, when executed on at least one processor, cause the at least one processor to carry out the method according to any one of embodiments 1 to 30.

Embodiment 36: A carrier containing the computer program of embodiment 35, wherein the carrier is one of an electronic signal, an optical signal, a radio signal, or a computer readable storage medium.

Embodiment 37: A non-transitory computer readable medium storing instructions executable by processing circuitry of a wireless communication device, WCD, whereby the WCD is operable to do one or more of the following:

perform (300) channel sensing of a channel to be used for sidelink transmission;

determine (300) a first set of resources that are available or not available for sidelink transmission from a perspective of the WCD (204-TX) based on results performing (300) the channel sensing;

receive (304) one or more resource coordination messages from one or more neighboring WCDs (204-RX1, 204-RX2);

determine (304) one or more second set of resources that are available or not available from perspectives of the one or more neighboring WCDs (204-RX1, 204-RX2) based on information comprised in the one or more resource coordination messages; and perform (306) resource selection for a sidelink transmission based on the first set of resources and the one or more second sets of resources.

Those skilled in the art will recognize improvements and modifications to the embodiments of the present disclosure. All such improvements and modifications are considered within the scope of the concepts disclosed herein.

The invention claimed is:

1. A method performed by a wireless communication device, WCD, (WCD) for resource selection for a sidelink transmission, the method comprising:

performing channel sensing of a channel to be used for sidelink transmission;

determining a first set of resources that are available or not available from a perspective of the WCD based on results of performing the channel sensing;

receiving one or more resource coordination messages from one or more neighboring WCDs;

determining one or more second set of resources that are available or not available from perspectives of the one or more neighboring WCDs based on information comprised in the one or more resource coordination messages;

performing resource selection for a sidelink transmission based on the first set of resources and the one or more second sets of resources, wherein performing the resource selection comprises selecting one or more resources for the sidelink transmission based on a combined set of resources that are available or not available, the combined set of resources being a combination of the first set of resources and the one or more second sets of resources; and determining whether to take the one or more resource coordination messages into consideration for performing resource selection, wherein the determining whether to take the one or more resource coordination messages into consideration for performing resource selection comprises considering only a number, N, of most recent resource coordination messages for performing resource selection.

2. The method of claim 1 wherein the combined set of resources is an intersection of the first set of resources and the one or more second sets of resources.

3. The method of claim 1 wherein the first set of resources and the one or more second sets of resources are sets of available resources, and performing the resource selection further comprises:

combining the first set of resources and the one or more second sets of resources such that the combined set of resources is an intersection of the first set of resources and the one or more second sets of resources;

determining that a number of resources in the intersection of the first set of resources and the one or more second sets of resources is less than a certain threshold; and expanding the combined set of resources to further comprise resources with one or more next highest commonality indices.

4. The method of claim 1 wherein the first set of resources and the one or more second sets of resources are sets of unavailable resources, and performing the resource selection further comprises:

combining the first set of resources and the one or more second sets of resources such that the combined set of resources is an intersection of the first set of resources and the one or more second sets of resources;

determining that a number of resources in the intersection of the first set of resources and the one or more second sets of resources is greater than a threshold; and modifying the combined set of resources to remove, as unavailable, resources with one or more next highest commonality indices.

5. The method of claim 3 wherein:

the one or more neighboring WCDs from which the one or more resource messages are received are N neighboring WCDs from which N resource messages are received, where N is an integer that is greater than or equal to 1;

resources with a highest commonality index N+1 are resources in the first set of resources and all of the N second sets of resources, which is the intersection of the first set of resources and the N second sets of resources; and the resources with the one or more next highest commonality indices comprise resources with a next highest commonality index N, where resources with the next highest commonality index N are resources comprised in the first set of resources and N−1 of the N second sets of resources.

6. The method of claim 1 wherein the combined set of resources is a union of the first set of resources and the one or more second sets of resources.

7. The method of claim 1 wherein performing the resource selection further comprises:

combining the first set of resources and the one or more second sets of resources such that the combined set of resources is a union of the first set of resources and the one or more second sets of resources only if a total number of resources in an intersection of the first set of resources and the one or more second sets of resources is less than a certain threshold if the first set of resources and the one or more second sets of resources are sets of available resources and greater than a certain threshold if the first set of resources and the one or more second sets of resources are sets of unavailable resources.

8. The method of claim 1 wherein performing the resource selection further comprises:

combining the first set of resources and the one or more second sets of resources such that the combined set of resources is an intersection of the first set of resources and the one or more second sets of resources only if a total number of resources in the intersection is greater than a certain threshold if the first set of resources and the one or more second sets of resources are sets of available resources and less than a certain threshold if the first set of resources and the one or more second sets of resources are sets of unavailable resources; and combining the first set of resources and the one or more second sets of resources such that the combined set of resources is a union of the first set of resources and the one or more second sets of resources only if the total number of resources in the intersection is less than the certain threshold if the first set of resources and the one or more second sets of resources are sets of available resources and greater than a certain threshold if the first set of resources and the one or more second sets of resources are sets of unavailable resources.

9. The method of claim 1 further comprising triggering re-selection of resources for sidelink transmission upon determining that a number of resources in the combined set of resources is less than a threshold if the first set of resources and the one or more second sets of resources are sets of available resources and greater than a threshold if the first set of resources and the one or more second sets of resources are sets of unavailable resources.

10. The method of claim 1 wherein the first set of resources, the one or more second sets of resources, and the combined set of resources are sets of available resources and the method further comprises triggering re-selection of resources for sidelink transmission upon determining that a previously selected resource is not one of the resources in the combined set of resources.

11. The method of claim 1 wherein the first set of resources, the one or more second sets of resources, and the combined set of resources are sets of unavailable resources and the method further comprises triggering re-selection of resources for sidelink transmission upon determining that a previously selected resource is one of the resources in the combined set of resources.

12. The method of claim 1 wherein N is a configured or pre-configured parameter.

13. The method of claim 1 wherein determining whether to take the one or more resource coordination messages into consideration for performing resource selection comprises determining whether to take at least one of the one or more resource coordination messages into consideration for performing resource selection based on whether the at least one of the one or more resource coordination messages was received within a predefined or configured threshold amount of time after sending a respective enquiry message.

14. The method of claim 1 wherein determining whether to take the one or more resource coordination messages into consideration for performing resource selection comprises determining whether to take at least one of the one or more resource coordination messages into consideration for performing resource selection based on whether a certain time relationship is satisfied.

15. A wireless communication device (WCD) for resource selection for a sidelink transmission, the WCD adapted to:

perform channel sensing of a channel to be used for sidelink transmission;

determine a first set of resources that are available or not available from a perspective of the WCD based on results of performing the channel sensing;

receive one or more resource coordination messages from one or more neighboring WCDs;

determine one or more second set of resources that are available or not available from perspectives of the one or more neighboring WCDs based on information comprised in the one or more resource coordination messages;

perform resource selection for a sidelink transmission based on the first set of resources and the one or more second sets of resources; and determining whether to take the one or more resource coordination messages into consideration for performing resource selection, wherein the determining whether to take the one or more resource coordination messages into consideration for performing resource selection comprises considering only a number, N, of most recent resource coordination messages for performing resource selection;

wherein, in order to perform the resource selection, the WCD is further adapted to select one or more resources for the sidelink transmission based on a combined set of resources that are available or not available, the combined set of resources being a combination of the first set of resources and the one or more second sets of resources.

* * * * *